US006684190B1

(12) United States Patent
Powers et al.

(10) Patent No.: US 6,684,190 B1
(45) Date of Patent: *Jan. 27, 2004

(54) APPARATUS AND METHOD FOR EXPOSING, EVALUATING AND RE-BALANCING RISK FOR DECISION-MAKING IN FINANCIAL PLANNING

(75) Inventors: James G. Powers, Albany, OR (US); Richard M. Weber, Safety Harbor, FL (US)

(73) Assignee: Financial Profiles, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/209,147

(22) Filed: Dec. 10, 1998

Related U.S. Application Data

(63) Continuation-in-part of application No. 08/778,073, filed on Jan. 7, 1997, now Pat. No. 5,956,691.

(51) Int. Cl.[7] .............................................. G06F 17/60
(52) U.S. Cl. ............................................. 705/4; 705/36
(58) Field of Search ................................. 705/4, 35–38

(56) References Cited

U.S. PATENT DOCUMENTS

| | | | |
|---|---|---|---|
| 4,800,510 A | 1/1989 | Vinberg et al. | |
| 4,831,526 A | 5/1989 | Luchs et al. | |
| 4,837,693 A | 6/1989 | Schotz | |
| 4,839,804 A | * 6/1989 | Roberts et al. | ................ 705/36 |
| 4,899,292 A | 2/1990 | Montagna et al. | |
| 4,953,085 A | 8/1990 | Atkins | |
| 4,975,840 A | 12/1990 | DeTore et al. | |
| 5,006,998 A | 4/1991 | Yasunobu et al. | |
| 5,083,270 A | 1/1992 | Gross et al. | |
| 5,095,429 A | 3/1992 | Harris et al. | |
| 5,185,696 A | 2/1993 | Yoshino et al. | |
| 5,210,687 A | * 5/1993 | Wolfberg et al. | ............ 705/4 X |
| 5,222,019 A | 6/1993 | Yoshino et al. | |
| 5,237,500 A | 8/1993 | Perg et al. | |
| 5,461,708 A | 10/1995 | Kahn | |
| 5,479,344 A | 12/1995 | Keziah, Jr. | |
| 5,495,412 A | 2/1996 | Thiessen | |
| 5,504,674 A | 4/1996 | Chen et al. | |
| 5,523,942 A | 6/1996 | Tyler et al. | |
| 5,537,315 A | 7/1996 | Mitcham | |
| 5,550,746 A | 8/1996 | Jacobs | |

(List continued on next page.)

FOREIGN PATENT DOCUMENTS

JP 406-127390 * 5/1994 .................. 705/36

OTHER PUBLICATIONS

IBM Technical Disclosure Bulletin, vol. 13, No. 11, Apr. 1971 "Real Estate Investment System", D.C. Gazis.*
National Underwriter, vol. 98, n6, p 7, Feb. 7, 1994, David C. Jones, "Due Care Systems Enters Illustration Wars".*
Journal of Risk and Insurance, v.58, n2 pp205–222, Jun. 1991, Hadi M. Behzad, Patrick S. Lee and Gautam Vora, "An exploration of an individual's decision–making regarding tax–defrred investment plans".*

Primary Examiner—Richard Chilcot
(74) Attorney, Agent, or Firm—Caesar, Rivise, Bernstein, Cohen & Pokotilow, Ltd.

(57) ABSTRACT

A dynamic, user-friendly financial and illustration system for evaluating, exposing and re-balancing, to the user's appropriate risk tolerance, the inherent risk in such financial planning areas as retirement, insurance, estate decision-making and targeted financial goal funding, e.g., college education, long-term care decisions, etc. This system provides a basis for both calculating and visualizing the elements of risk, and the re-balancing of that risk in accordance with the user's risk tolerance, in any financial decision when the underlying elements of risk are known and can be inputted or computed.

99 Claims, 39 Drawing Sheets

U.S. PATENT DOCUMENTS

| | | |
|---|---|---|
| 5,590,037 A | 12/1996 | Ryan et al. |
| 5,636,117 A | 6/1997 | Rothstein |
| 5,649,085 A | 7/1997 | Lehr |
| 5,655,085 A | 8/1997 | Ryan et al. |
| 5,666,492 A | 9/1997 | Rhodes et al. |
| 5,673,402 A | 9/1997 | Ryan et al. |
| 5,956,691 A * | 9/1999 | Powers ............................ 705/4 |
| 5,974,390 A * | 10/1999 | Ross ............................... 705/4 |
| 5,991,744 A * | 11/1999 | DiCresce .................... 705/4 X |
| 6,009,402 A * | 12/1999 | Whitworth ..................... 705/4 |
| 6,275,814 B1 * | 8/2001 | Giansante et al. ............. 705/36 |

\* cited by examiner

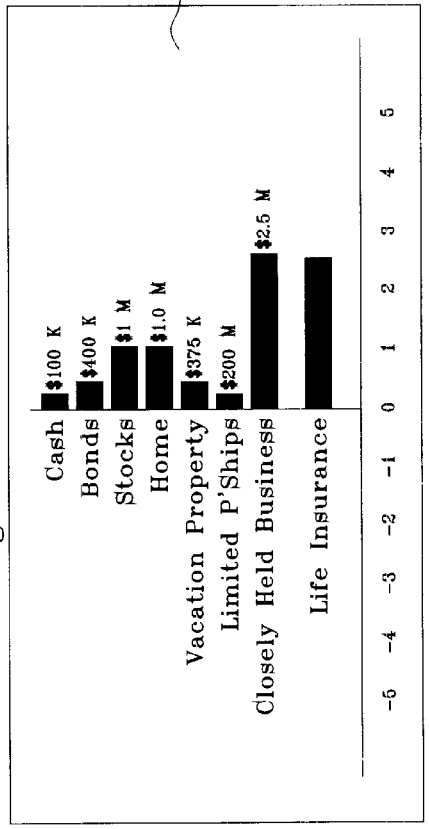
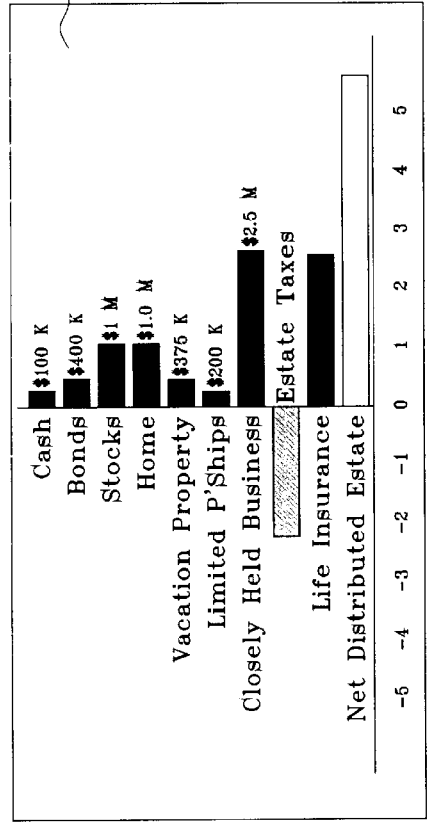
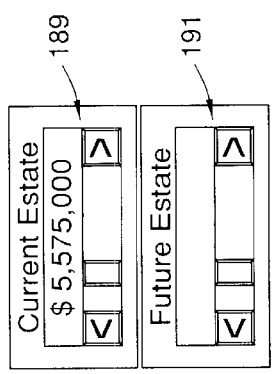
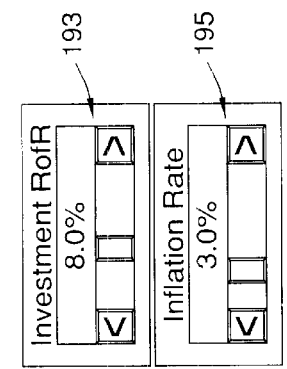
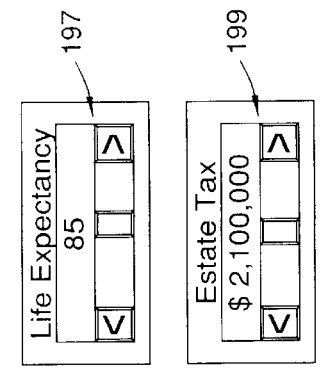
FIG. 14

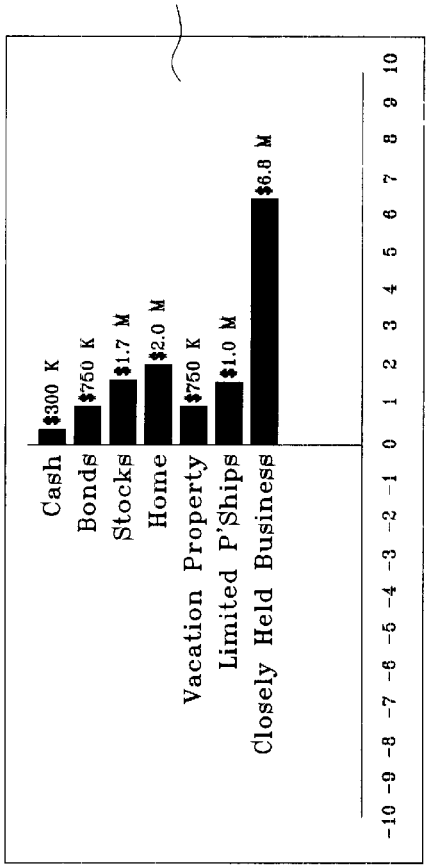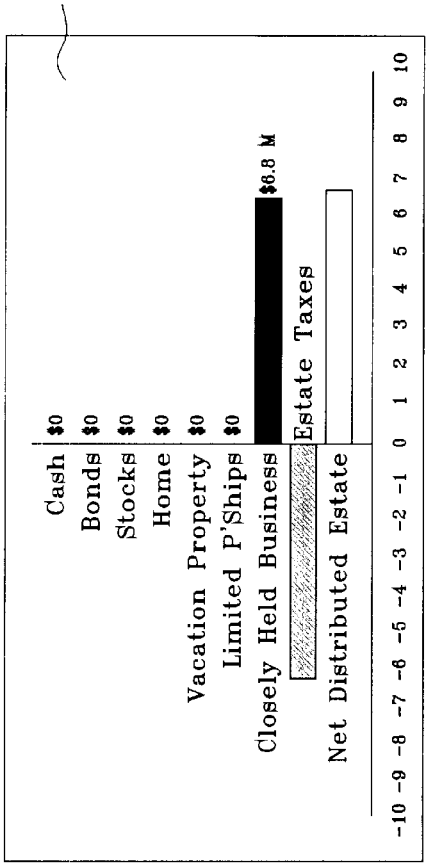
FIG. 15

313    317    321
   315    319

| Policy Variations | | | | | [X] |
|---|---|---|---|---|---|
| Increasing Death Benefit | 1st Yr Extra Prem | Varying Premiums | Withdrawals | In-Force | |

☑ Please show a first year extra premium

First Year Extra Premium

Occasionally, one policy may be exchanged for another or a policy owner may wish to make an extra one-time premium payment in the first year of a policy.

Enter the net amount of extra cash that is to be added to this policy in year 1.

First Year Extra Premium     $10,000

Exit and Re-Graph                    Reset to Default

FIG. 21

APPARATUS AND METHOD FOR EXPOSING, EVALUATING AND RE-BALANCING RISK FOR DECISION-MAKING IN FINANCIAL PLANNING

RELATED APPLICATIONS

This application is a Continuation-in-Part of application Ser. No. 08/778,073, filed on Jan. 7, 1997, now U.S. Pat. No. 5,956,691, entitled DYNAMIC POLICY ILLUSTRATION SYSTEM and whose entire disclosure is incorporated by reference herein.

FIELD OF THE INVENTION

This invention relates generally to the field of computer-based systems regarding financing information, and more particularly, to a computer apparatus and method for exposing risk inherent in various financial plans using dynamic graphs and displays and for then permitting the user to re-balance that risk according to his/her risk tolerance.

BACKGROUND OF THE INVENTION

The following United States Patents describe various types of computer based systems regarding insurance data:

U.S. Pat. No. 5,655,085 (Ryan et al.) discloses a computer system for preparing and processing multiple universal life insurance quotes and for preparing and processing universal life insurance applications based on these quotes (FIG. 1 of the '085 patent). In particular, the computer system of the '085 patent makes it possible for a single computer to efficiently provide multiple life insurance product illustrations for multiple life insurance carriers. The system of the '085 patent steps a user through the application preparation process.

U.S. Pat. No. 5,479,344 (Keziah, Jr.) discloses an apparatus for receiving insurance data and for displaying life insurance needs in numerical format.

U.S. Pat. No. 5,523,942 (Tyler et al.) discloses a computer implemented graphical user interface for receiving instructions and information relating to insurance. The displays use conventional Window format for entering and displaying numerical data in tabular form.

U.S. Pat. No. 4,831,526 (Luchs et al.) discloses a computer system for processing and preparing applications for insurance and premium quotations and for preparing and writing insurance contracts. The displays utilize line displays.

U.S. Pat. No. 4,975,840 (DeTore et al.) discloses a method and apparatus for evaluating the insurability of a potentially insurable risk.

U.S. Pat. No. 5,504,674 (Chen et al.) discloses a communications network for processing insurance claims of objects.

U.S. Pat. No. 4,837,693 (Schotz) discloses a system including a group of computers for facilitating the implementation and administration of a desired group insurance plan.

U.S. Pat. No. 4,899,292 (Montagna et al.) discloses a system for storing and retrieving text and associate graphics for insurance estimation or service manuals.

U.S. Pat. No. 5,550,746 (Jacobs) discloses a method and apparatus for storing and selectively retrieving product data by correlating customer selection criteria with optimum product designs based on embedded expert judgments.

U.S. Pat. No. 5,537,315 (Mitcham) discloses a method and apparatus for permitting a patron to purchase an insurance policy and an insurance binder from a computerized kiosk.

It should be understood from the outset that the use of the term "illustration" is a term of art describing any numeric, or graphic, interpretation and projection of assumptions of the future values of a life insurance policy.

Two types of illustration software exist on the marketplace: (1) product illustrations and 2) concept illustration software. Both are static, number, time and paper intensive systems.

Current product software calculates policy values and creates a ledger of numbers (generally from 6 to 20 pages in length) which illustrate what a specific insurance company's policy values may look like in the future under a static set of economic assumptions (including Premiums paid in, Interest credited to the policy, Mortality charges, Selling expenses, General expenses, Lapse Rates). Although these illustrations contain footnotes which state that the policy has many "non-guaranteed" assumptions most of the company's specific assumptions are not disclosed to the reader. Thus, it is impossible for the policy buyer to fully understand what the term "non-guaranteed" may mean as it might effect his future policy values.

Using an input screen on a PC or mainframe computer an agent or home office can enter policy input data to create one illustration at a time. The ledger and possibly a graph may be created illustrating this one set of assumptions. If a second set of assumptions is to be considered the input data must be changed or reentered and the ledger pages and graph reprinted. The output of dozens of pages of numbers and or a few graphs can be laid side by side to compare these two possible outcomes. In most cases agents will summarize this data and create a new summary of values to discuss with his client.

The problem with this approach is that it is labor, time and paper intensive and can only cover a very few alternatives. The result is a policy design and buying decision based on a limited number of alternatives considered.

The second type of illustration system in the market transfers the primary illustration data created above, inside the computer to a new platform to illustrate a sales concept rather than a policy per se. This generally requires some type of transfer of data from the main illustration system to a second system where it can be formatted into a variety of sales concepts. All these systems generate a single ledger and series of static graphs which can be used with a client. (Most of these systems also require the printing and delivery to client of all the pages from the basic illustration and footnotes mentioned above.)

The following companies sell software programs that fall in the above categories and which calculate life insurance policy data, print out numbered illustrations and/or present static graphic depictions: Fipsco of Des Plaines, Ill.; United Systems of Park City, Utah (INTEFLEX); FDP of Miami, Fla.; and Insmark of San Ramon, Calif.

The following United States Patents describe various types of computer based systems regarding financial data:

U.S. Pat. No. 4,839,804 (Roberts et al.) discloses a method and apparatus for insuring the funding of a future liability of uncertain cost.

U.S. Pat. No. 4,953,085 (Atkins) discloses a system for the operation of a financial account.

U.S. Pat. No. 5,083,270 (Gross et al.) discloses a method and apparatus for releasing value of an asset.

U.S. Pat. No. 5,237,500 (Perg et al.) discloses a system and process for converting constant dollar financial instruments.

U.S. Pat. No. 5,006,998 (Yasunobu et al.) discloses a computerized consultation system that permits the user to request advice and/or expert's opinion regarding financial matters.

U.S. Pat. No. 5,095,429 (Harris et al.) discloses a method for modifying calculations on financial data in a financial information system whereby manually input data entered as a value can be prioritized above other values that are dependent on the first value by setting a lock flag to indicate that the data is to be secured against change by subsequent recalculation on the cell.

U.S. Pat. No. 5,495,412 (Thiessen) discloses a method and apparatus for supporting computerized interactive and assisted negotiations. This method and system computerize negotiation issues, preferences, and interested-stake holders and requires the parties to consider alternatives simultaneously, rather than separately.

U.S. Pat. No. 5,590,037 (Ryan et al.) discloses a method and system for computing a financial projection and an illustration of a prefunding program for an employee benefit.

U.S. Pat. No. 5,666,492 (Rhodes et al.) discloses a computer-based pharmaceutical care cognitive services management system and method that permits the transformation of pharmacist from vendor to a health care provider. The system utilizes a window display-format with multiple data fields for entering user-particular information.

U.S. Pat. No. 5,673,402 (Ryan et al.) discloses a computer system for producing an illustration of an investment repaying a mortgage. In particular, the '402 patent discloses a computer system for preparing, processing and transmitting life insurance premium quotes as part of a mortgage calculation in support of a new financial product.

U.S. Pat. No. 5,636,117 (Rothstein) discloses a method and apparatus for monitoring the strength of a real estate market or commodity market and making lending and insurance decisions therefrom.

U.S. Pat. Nos. 5,185,696 and 5,222,019 (Yoshino et al., wherein the '019 patent is a divisional application of the '696 patent) disclose a financial calculator capable of displaying graphical representations of financial characteristics. However, among other things, the graphical representations are static and do not permit the user to vary any number of financial variables to "see" the effects in a dynamic illustration.

The following United States Patents describe various computer-based graphics systems:

U.S. Pat. No. 5,461,708 (Kahn) discloses a system and method for automated graphing of spreadsheet information based on the informational content and the layout of user-selected information. However, among other things, the graphical representations are static and do not permit the user to vary any number of variables to "see" the effects in a dynamic illustration; in addition, the system and method require the input of raw data in a spreadsheet cell-format ("notebook interface" 200-FIG. 2A) by the user.

U.S. Pat. No. 5,649,085 (Lehr) discloses a method and system for graphically displaying system operation trace information so that graphical objects representing event-pairs within the system operation are not visually obscured.

U.S. Pat. No. 4,800,510 (Vinberg et al.) discloses a method and system for permits high level control of computer-generated graphs, such as bar graphs, pie-charts and conventional X-Y plots.

Thus, there remains a need for an apparatus/method that allows the user to rapidly vary assumptions and view a dynamic illustration of future values of all types of financial planning, e.g., life insurance planning, estate planning, retirement planning and investment planning in order to reveal the risk inherent in such planning and to thereby give the user the ability to evaluate and re-balance the risk in accordance with his/her risk tolerance.

OBJECTS OF THE INVENTION

Accordingly, it is the general object of this invention to provide an apparatus which addresses the aforementioned needs.

It is a further object of this invention to provide an apparatus and method of exposing risk inherent in financial planning areas such as retirement, insurance, estate decision-making and targeted financial goal funding.

It is another object of this invention to provide an apparatus and method of evaluating risk inherent in financial planning areas such as retirement, insurance, estate decision-making and targeted financial goal funding.

It is a further object of this invention to provide an apparatus and method of re-balancing, according the user's appropriate risk tolerance, the inherent risk in financial planning areas such as retirement, insurance, estate decision-making and targeted financial goal funding.

It is yet another object of this invention to provide an apparatus and method of visualizing the elements of risk in any financial decision when the underlying elements of risk are known and can be inputted or computed.

It is still yet a further object of this invention to provide an apparatus and method of both visualizing the elements of risk and the re-balancing of that risk in accordance with the user's risk tolerance in any financial decision when the underlying elements of risk are known and can be inputted or computed.

It is yet another object of this invention to provide an apparatus and method for demonstrating the actual tradeoffs between premiums and values.

It is still yet another object of the present invention to provide and apparatus and method that provides the user with the ability to inquire about the specifics of the financial plan and then to modify at least one variable to the see the effects of such modification on the financial plan.

It is yet another object of this invention to provide an apparatus and method, concerning a life insurance plan, that provides a graphic depiction of the generic guaranteed values, generic assumed values, possible premiums and life expectancy, in respective graphs at the same time in the same display screen.

It is still yet a further object of this invention to provide an apparatus and method, concerning an estate plan, that provides a display of estate assets in the order of their liquidity and which can show their consumption upon death of the estate owner in accordance with estate taxes.

It is even yet a further object of this invention to provide an apparatus and method that provides an illustration system, for a plurality of financial plans, having an illustration screen that changes so that a motion picture effect occurs, thereby allowing the user to see many alternatives quickly.

It is still yet even a further object of this invention to provide an apparatus and method for a financial plan illustration system through which the user can reset any single assumption, view the outcome, or set a range of changing assumptions and view the progression of the policy from one point to another point.

It is yet even another object of this invention to provide an apparatus and method for a life insurance illustration system that permits the user to have a computer correct any of a number of variables to create an illustration which stays in force for life.

It is still yet another object of this invention to provide an apparatus and method that utilizes an alternative investment appreciation method, namely the S&P500® Index, for calculating future values of the financial plan.

It is even yet another object of this invention to provide an apparatus and method for a life insurance illustration system that permits the user to visualize the risk with electing an increasing death benefit and to then re-balance the risk to meet user objectives.

It is still yet a further object of this invention to provide an apparatus and method for a life insurance illustration system that permits the user enter an extra premium to be paid during the $1^{st}$ year, in addition to the regular, annular premium, to see the effects of the extra premium on the death benefit and the cash value.

It is still another object of this invention to provide an apparatus and method for a life insurance illustration system that permits the user to enter various premiums in order to explore the risk associated with paying these different premiums and then permitting the user to re-balance the risk to meet user objectives.

It is even yet a further object of this invention to provide an apparatus and method for a life insurance illustration system that permits the user to determine the amount of premiums necessary to keep a policy in-force when certain withdrawals of cash value are made from the life insurance plan at predetermined intervals.

It is still yet a further object of this invention to provide an apparatus and method for a life insurance illustration system that permits the user to test a current life insurance plan against original assumptions made on the life insurance plan.

SUMMARY OF THE INVENTION

These and other objects of the instant invention are achieved by providing an apparatus for revealing to a user the risk inherent in financial planning. The apparatus comprises: (a) a computer including a memory, a processor and a graphical user interface; (b) input means coupled to the computer for inputting variables related to a financial plan (e.g., a retirement plan, an estate plan, an investment plan, a life insurance plan, etc.) into the computer by the user; (c) a monitor display coupled to the computer for displaying the variables and future values of the financial plan; (d) where the memory includes: (1) calculation means, operable by the processor, for calculating the future values of the financial plan; (2) at least one financial planning module, operable by the processor and coupled to the calculation means, for controlling the graphical user interface to generate the future values in graphical format; and (e) means for modifying, coupled to the at least one financial planning module, the at least one variable of the financial plan by the user from a first value to a second value, and whereby the at least one financial planning module controls the graphical user interface in accordance with the modification of the at least one variable from the first value to the second value to provide a graphical representation of the risk inherent in the financial plan.

These and other objects of the instant invention are also achieved by providing a method for revealing the risk inherent in a financial plan (e.g., a retirement plan, an estate plan, an investment plan, a life insurance plan, etc.). The method comprises the steps of: (a) providing a computer including a memory, a processor, input means, and a monitor; (b) supplying the computer with user-particular data and financial plan data through the input means; (c) supplying the memory with finance algorithms; (d) calculating future values of the financial plan using the user-particular data, financial plan data and the finance algorithms using the processor; (e) modifying at least one variable of the financial plan by the user from a first value to a second value; (f) presenting a continuously changing graphical display on the monitor in accordance with the modification of the at least one variable, and whereby the changing graphical display reveals the risk inherent in the financial plan.

DESCRIPTION OF THE DRAWINGS

Other objects and many of the attendant advantages of this invention will be readily appreciated as the same becomes better understood by reference to the following detailed description when considered in connection with the accompanying drawings wherein:

FIGS. 13–16 are main screen displays of an estate planning module depicting particular estate values;

FIG. 21 is the input screen display for the $1^{st}$ year extra premium sub-module;

DESCRIPTION OF THE PREFERRED EMBODIMENT OF THE INVENTION

Figure 1:
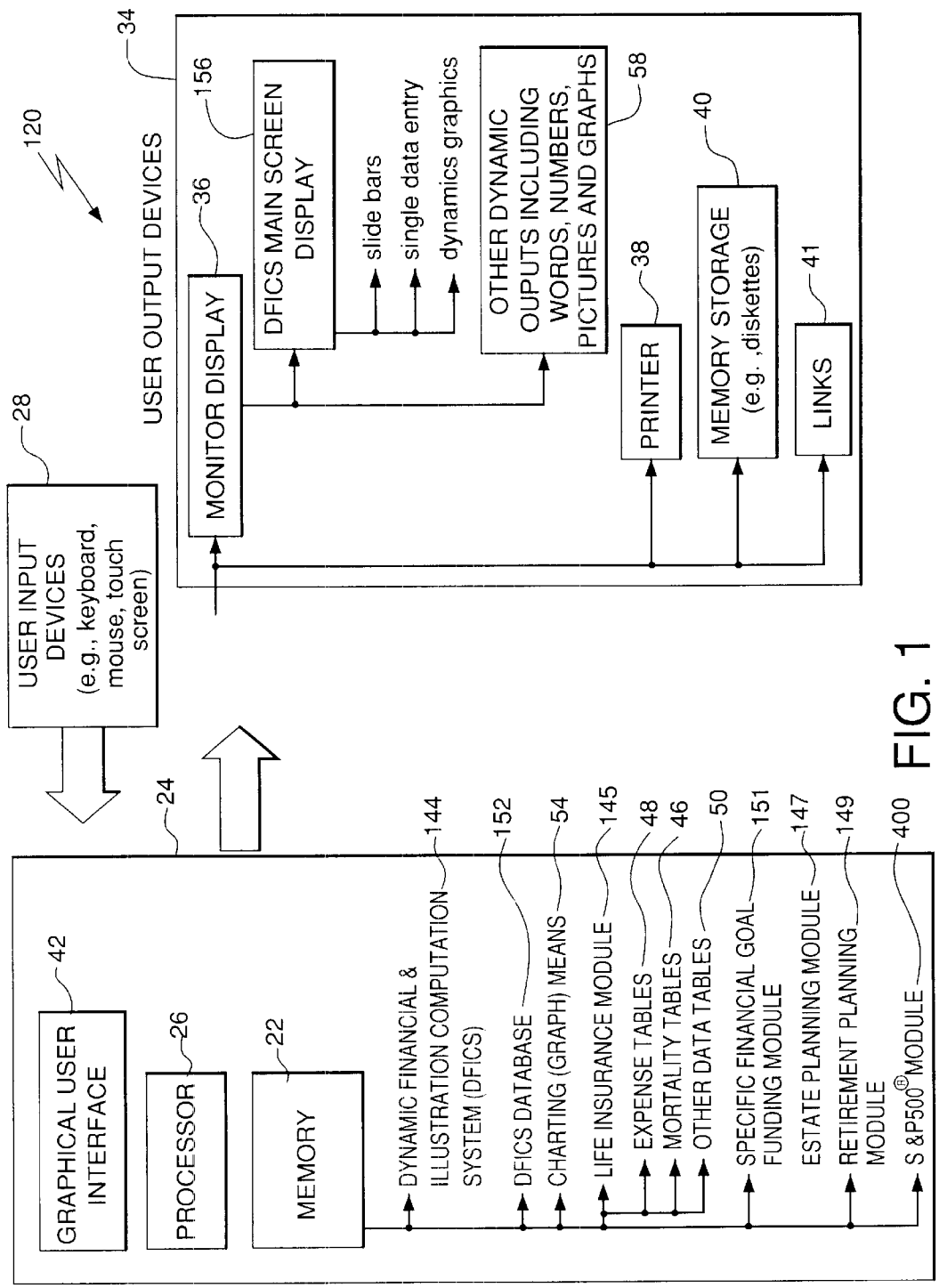
FIG. 1 is a block diagram of the present invention.
Figure 2:
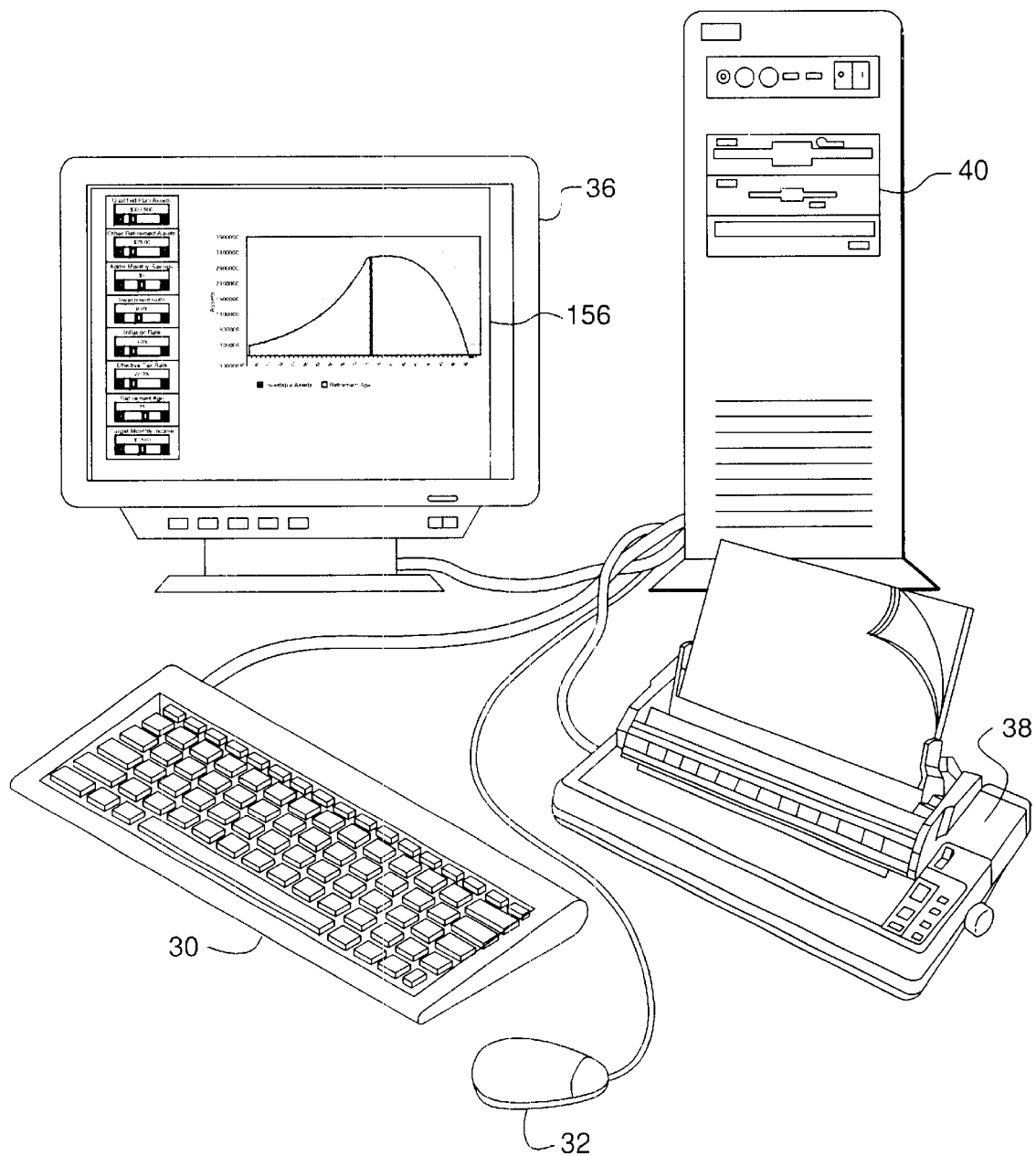
FIG. 2 is a view of a computer for supporting the present invention.

Referring now in greater detail to the various figures of the drawing wherein like reference characters refer to like parts, an apparatus for exposing, evaluating and re-balancing risk for decision-making in financial planning (hereinafter, "apparatus") constructed in accordance with the present invention is shown generally at 120 in FIG. 1.

The apparatus 120 is similar to the DPIS (Dynamic Policy Illustration System) 20 of application Ser. No. 08/778,073 except for the contents of the memory 22, as shown in FIG. 1. In all other respects, the various hardware elements, e.g., the computer 24, the user input devices 28 and the user output devices 34 (discussed in detail in application Ser. No. 08/778,073) of the apparatus 120 are similar to the DPIS 20 hardware and, as a result, will not be discussed any further.

At this point, it should be understood that the DPIS 20 of application Ser. No. 08/778,073 is directed to an apparatus and method for exposing, evaluating and re-balancing (in accordance with the user's risk tolerance) the inherent risk in life insurance planning. The present invention 120 includes all of the software for carrying out the apparatus and method of the DPIS 20 in a software module in the apparatus 120 hereinafter known as the life insurance module 145. Life insurance module 145 comprises the expense tables 48, mortality tables 46 and other data tables 50 discussed in application Ser. No. 08/778,073. Furthermore, the apparatus 120 has a much broader application in that not only does it serve as an apparatus and method for exposing, evaluating and re-balancing the inherent risk in life insurance planning, but the apparatus 120 also serves as an apparatus and method for exposing, evaluating and re-balancing the inherent risk in financial planning in general, e.g., estate planning, retirement planning and specific financial goal planning (e.g., investment planning). In particular, the apparatus 120 also includes the following software modules: estate planning module 147, retirement planning module 149, and specific financial goal planning module 151. Although not shown, the user has the ability to select which financial planning module he/she would like to activate (e.g., on power up of the apparatus 120, a display screen appears that provides the user with the ability to select LIFE INSURANCE, ESTATE PLANNING, RETIREMENT PLANNING or SPECIFIC FINANCIAL GOAL PLANNING).

To carry out each of these financial planning modules, the DICS 44 (dynamic illustration computation system) of application Ser. No. 08/778,073 has been replaced by the dynamic financial and illustration computation system (DFICS) 144. The DFICS 144 comprises all of the algorithms necessary for calculating the time value of money functions for determining the proper future values (e.g., present values and payment values) which pertain to each of the respective financial planning modules 145–151. The particular algorithms used in the DFICS 144 for the respective financial planning modules 145–151 are known in the art and are not discussed in detail in the present application.

As with the main screen display 56 of the DPIS 20 of application Ser. No. 08/778,073, the most important screen of the apparatus 120 is the main screen display 156. The main screen display 156 provides a view screen which instantly displays a color graph(s) of the respective future values of the particular financial plan in modules 145–151 based on the user inputs and the pertinent financial planning module assumptions (both the inputs and assumptions being referred to hereinafter as "variables"). The user can enter, or modify, these variables that affect the financial performance and, thereby, instantly view the effect on future policy values over his/her lifetime. In particular, by manipulating slide bars or buttons in the main screen display 156, the user can move the main screen display 156 through a dynamic succession of variables to gain an understanding of how the financial planning (e.g., the estate planning, or the retirement planning, etc.) might be affected by changes in one or more variables. This progression of the main screen display 156 through a dynamic succession of variables is hereinafter referred to as incremental solve. The increments of the variable that is being modified can be preset by the user. Alternatively, the user has the option of having the main screen display 156 jump directly to the solved financial planning policy, hereinafter known as instant solve. Thus, the main screen display 156 exposes the risk inherent in the particular financial plan being discussed. This permits the user to then evaluate and re-balance this risk in accordance with the user's risk tolerance.

The apparatus 120 also includes another module 400 that can operate in conjunction with the life insurance module 145, the estate planning module 147, the retirement planning module 149, and the specific financial goal planning module 151. This module is known as the S&P500® sub-module 400. The S&P500® module 400 provides a more sophisticated variation of estimating future investment appreciation. As will be discussed in detail later, the S&P500® sub-module employs a period of sequential years of historic S&P500® annual returns as an alternative approach to anticipating possible investment appreciation.

The Financial Planning Modules

FIGS. 3–7 depict the main screen displays 156 for the retirement planning module 149. The risk in retirement planning is having insufficient income to meet retirement objectives. Users need to see the trade-offs so that they can balance their tolerance for risk with the different risk-related options.

The retirement planning module 149 utilizes the following parameters which can be an inputted by the user or can be a calculated value:

the value of qualified retirement plan assets;

the value of other retirement assets;

assumed or desired rate of return;

assumed rate of inflation;

assumed effective income tax rate;

desired retirement age;

targeted monthly income; and necessary pre-retirement monthly contribution.

When sufficient inputs are known, the other variables can be calculated. For example, when seven of the above eight necessary inputs are known, the eighth can be calculated and shown via a graph in the main screen display 156. By observing the screen display 156, the user can visualize whether his/her objectives are being met and he/she can then vary (using the slider bars) or calculate the solution that will meet his/her objectives.

In particular, the main screen display 156 for the retirement planning module (FIGS. 3–7) comprises a qualified plan asset slider bar/window 153, other retirement assets slider bar/window 155, additional monthly savings slider bar/window 157, investment rate of return slider bar/window 159, inflation rate slider bar/window 161, effective tax rate slider bar/window 163, retirement age slider bar/window 165, and target monthly income slider bar/window 167. A graph 169 is presented in the main screen display 156 which plots Assets ($) vs. Age (years). The vertical line indicated as "Retirement Age" in the graph 169 indicates the "accumulation phase" (i.e., to the left of the "Retirement Age" line) and the "distribution phase" (i.e., to the right of the "Retirement Age" line) of the retirement plan.

Figure 3:
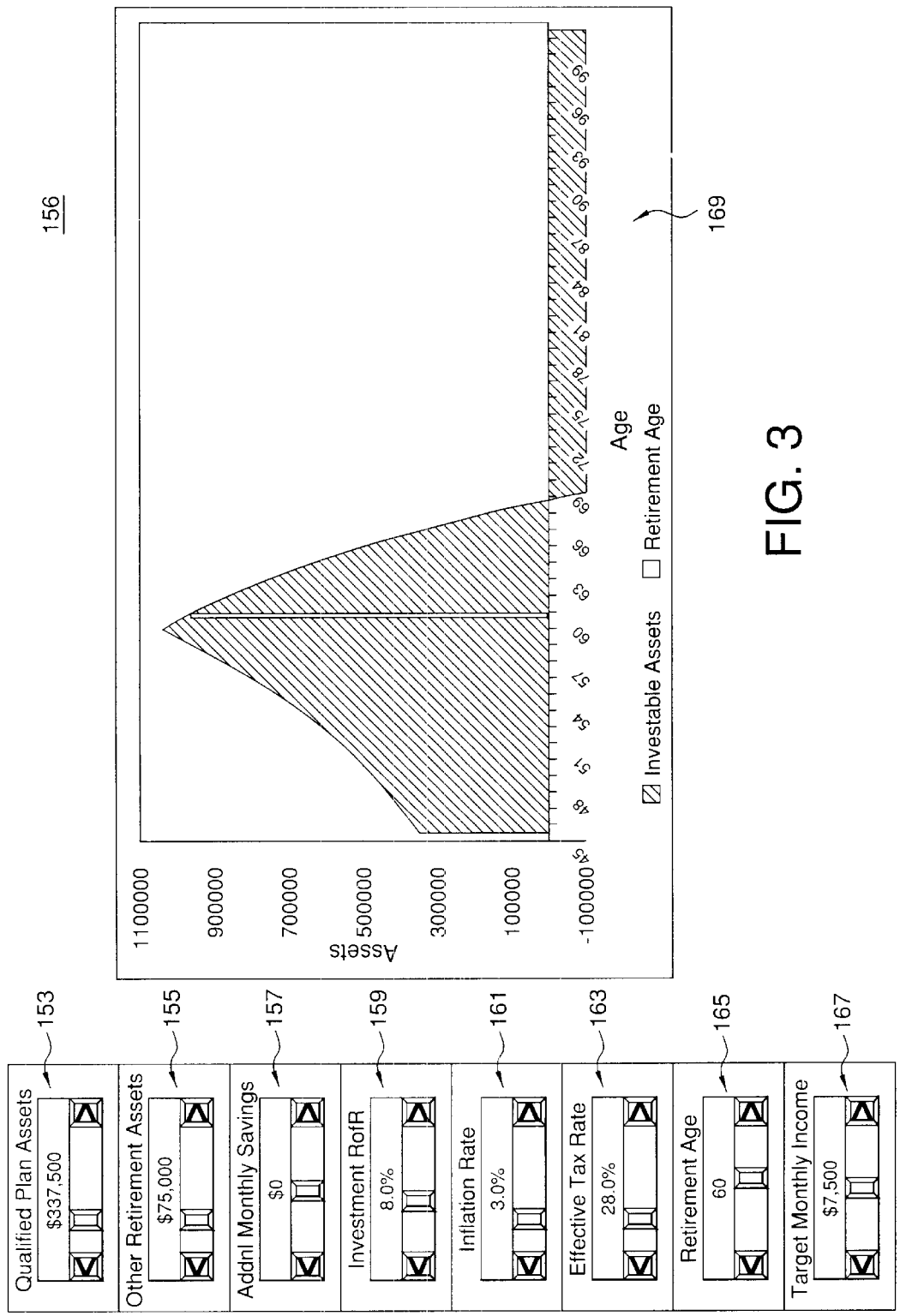
FIGS. 3–7 are main screen displays of a retirement planning module depicting particular retirement values.
Figure 4:
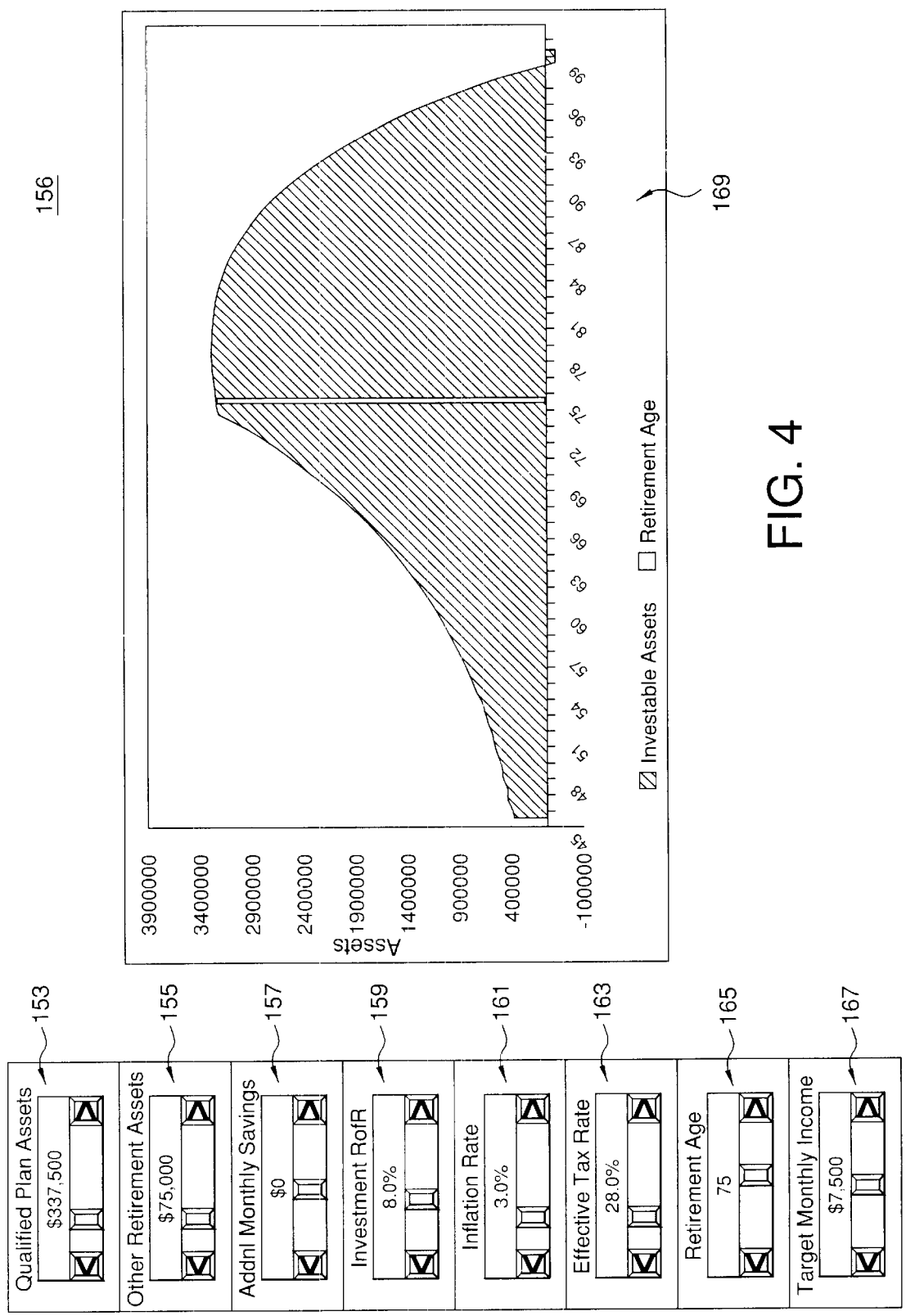
Figure 5:
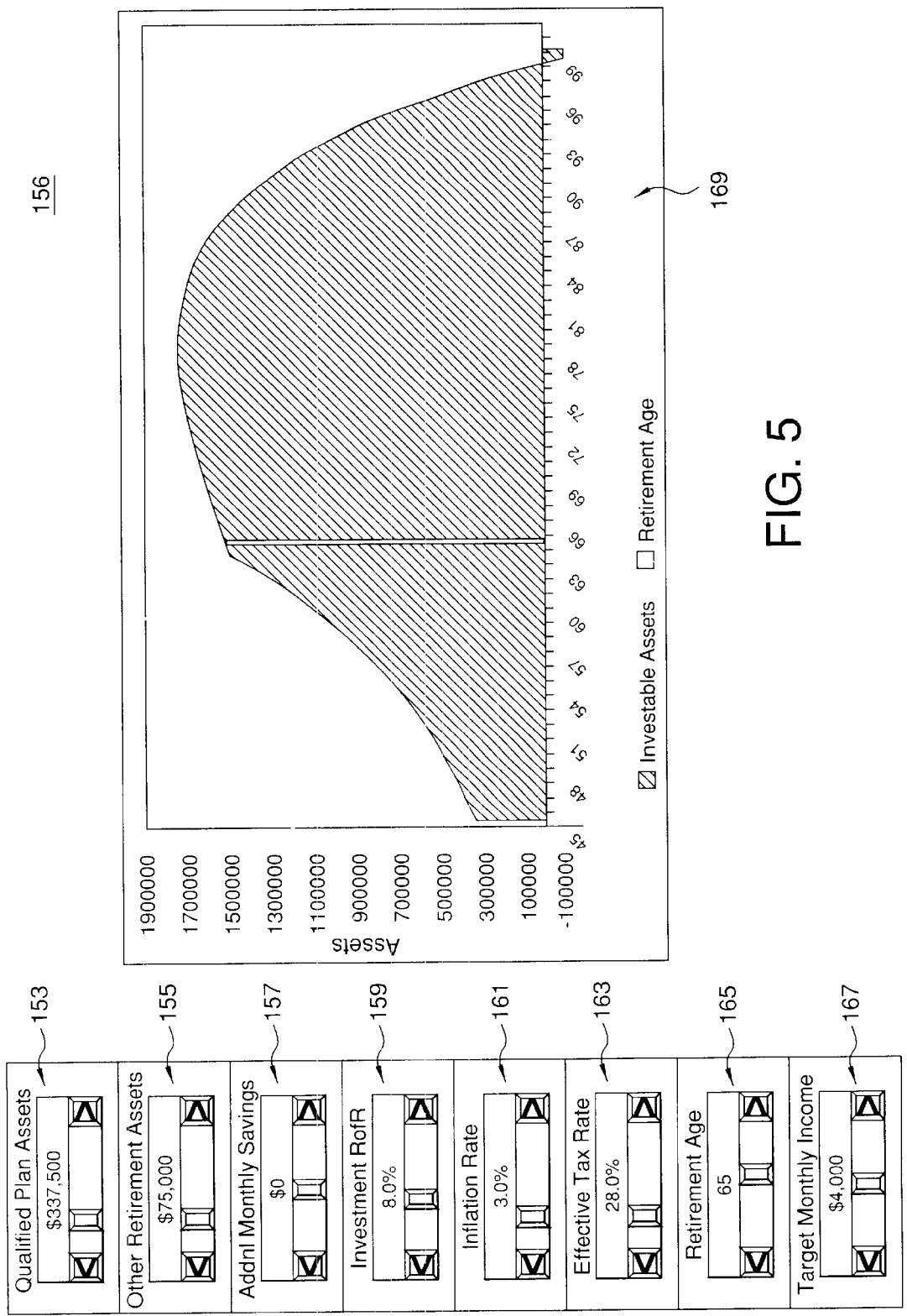
Figure 6:
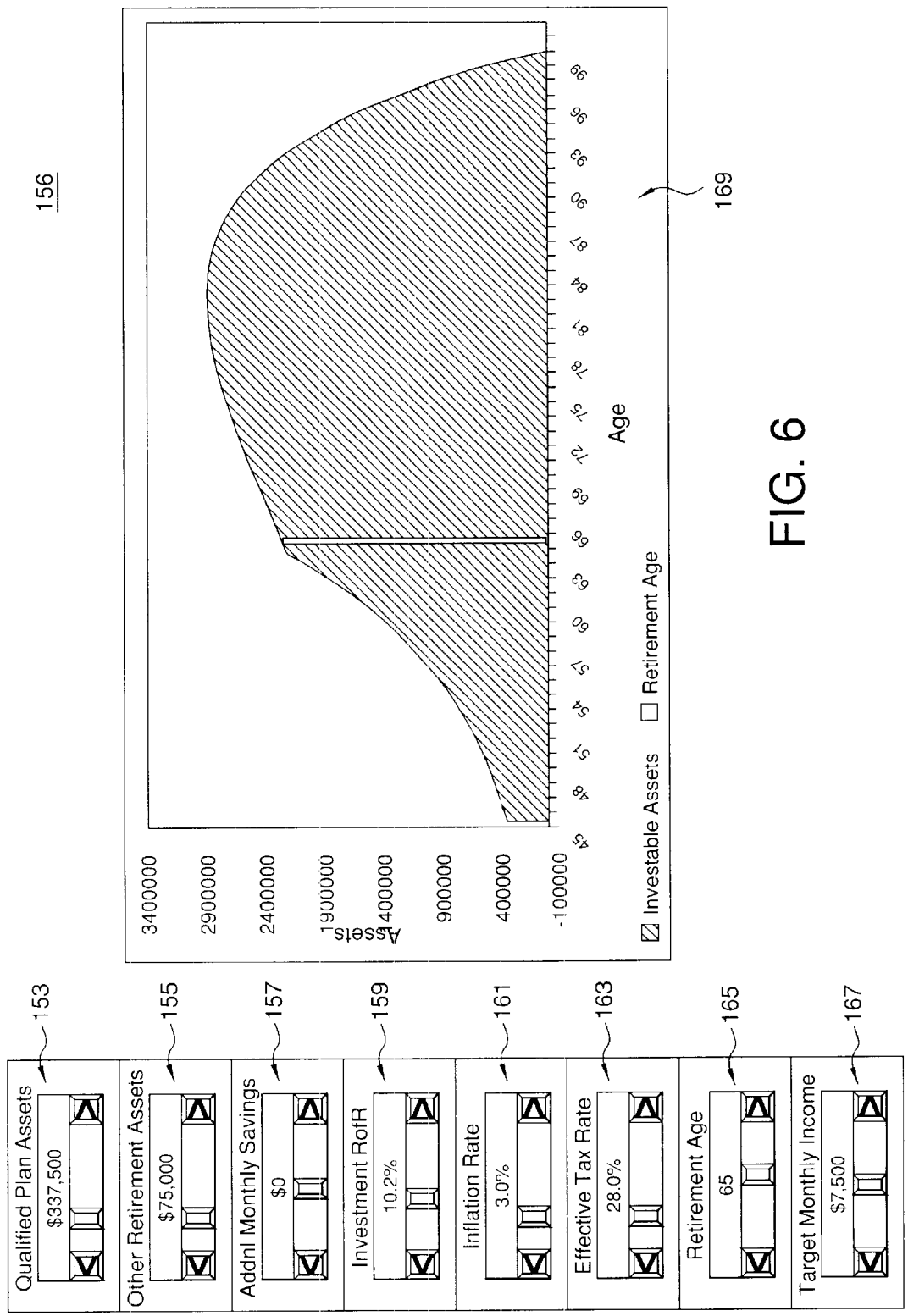
Figure 7:
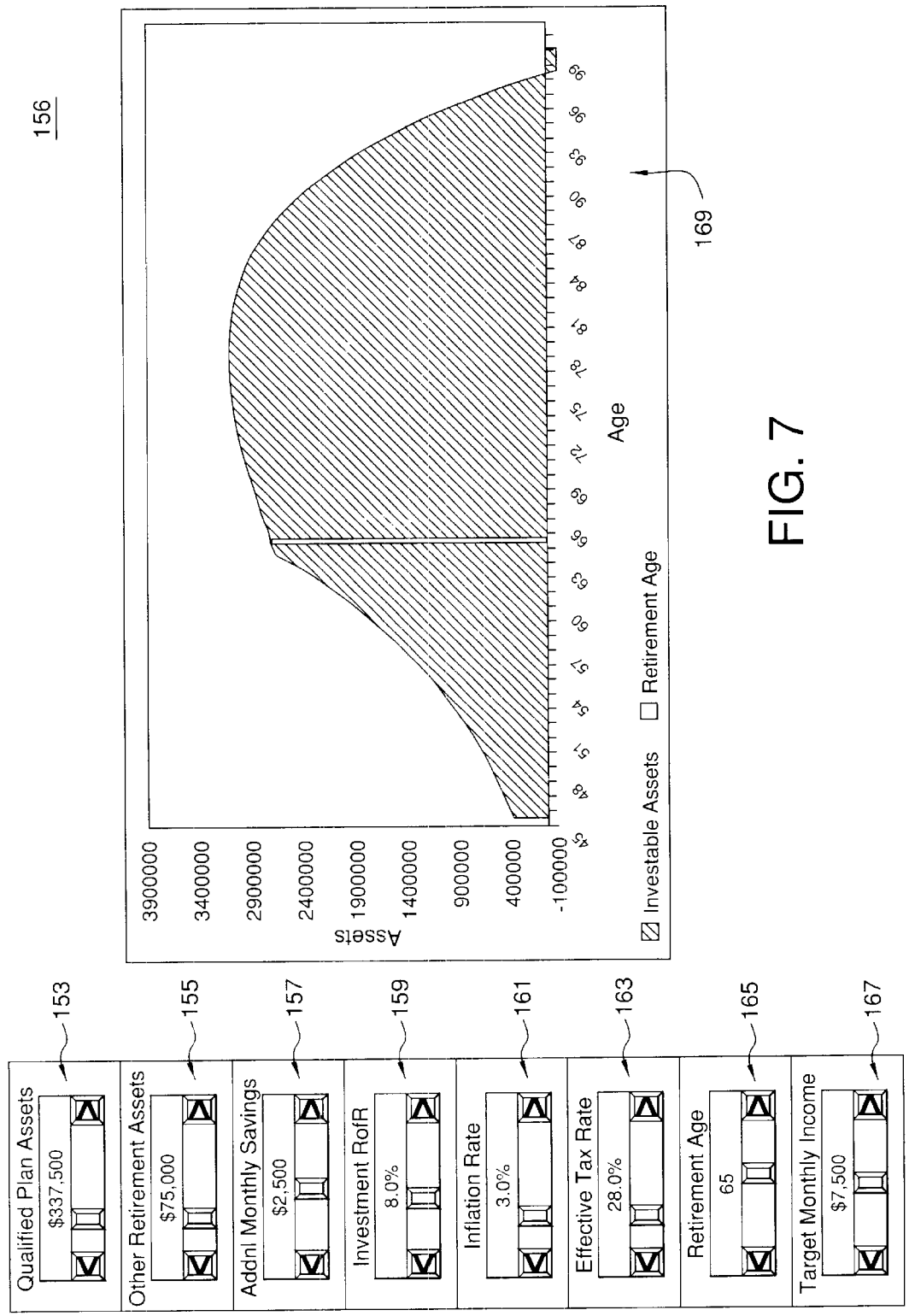

An example of how the risk, in retirement planning, is exposed to the user and how the user uses the apparatus 120 to evaluate and then re-balance the risk according to his/her risk tolerance is shown in the sequence of FIGS. 3–7. In FIG. 3, given the particular values as shown in the slider bar/windows 153–167, that particular retirement plan fails because the user cannot retire at age 60 with the current indicated assets and achieve the goal of $7500.00 of income for life. The user then clicks on the retirement age slider bar/window 165 which moves the main screen display 156 to FIG. 4. The plot 169 in FIG. 4 indicates the user would have to postpone retirement to age 75 in order for the existing assets (and growth/inflation assumptions) to provide the desired income for life. The user may not want to wait that long and wants to know at his/her targeted age 65, how much income will be available. To determine that, the user inputs "65" into the slider bar/window 165 and clicks on the target monthly income slider bar/window 167. The user is then provided with both a calculation and a graphic visualization of the compromise that will work (FIG. 5); thus, with the assets, monthly savings and the rates shown in the slider bar/windows 153–163, the user would be able to retire at age 65 with a monthly income of $4,000.00. If the user wishes to know what rate of return would provide all of his/her objectives (i.e., to retire at age 65 with a monthly income of $7,500.00), the user clicks on the investment rate of return slider bar/window 159. The user is then provided with another calculation and a graphic (FIG. 6) that indicates that in order to retire at age 65 with a $7,500.00/month income, a 10.2% rate of return must be achieved with the current level of assets and inflation rate. The user may then want to know what amount of monthly contribution would be necessary to make now in order to achieve his/her goals with only a 8% investment assumption. The user would then click on the additional monthly savings slider bar/window 157 to see the next calculation and resulting graphic image which would indicate that a $2,500.00 additional monthly savings would be required.

Thus, the retirement module 149 provides the user with immediate graphic feedback on the consequences of existing conditions (including existing assets, risk tolerance for investment allocations, tax rates, etc.) to the likelihood of accomplishing the original financial objectives. To the extent that the original expectation cannot be met, the user interactively and dynamically explores and calculates his/her options, such as accepting more investment return risk, assuming lower inflation, accepting a lower monthly retirement income or determines the necessity of additional contributions to retirement accumulations.

It should be noted that in the retirement module 149, other considerations need to be addressed:

1) Qualified retirement plans include the following factors which must be considered when evaluating risk:

future annual contributions;

anticipated investment rate of return; and rate of inflation as it would affect the user during the "accumulation phase", since the rate of inflation during the accumulation phase and the distribution phase are not the same.

2) The user may also have assets outside a qualified plan which are dedicated to accumulation for retirement. The variables of future monthly contributions, investment rate of return, anticipated rate of return on investment gains and inflation need to be considered.

3) Distribution of retirement income which may include the following variables:

target monthly income;

retirement age;

effective tax rate during retirement; and inflation rate during retirement.

FIGS. 8–12 depict the main screen displays 156 for the specific financial goal funding module 151. The risks in targeted investment planning include insufficient time to fund, insufficient earnings and insufficient contribution necessary to achieve financial objectives. Users need to see the trade-offs so that they can balance their tolerance for risk with the different risk-related options.

The specific financial goal funding module 151 utilizes the following parameters which can be an inputted by the user or can be a calculated value:

the value of beginning capital;

additional periodic contribution;

assumed or desired rate of return;

assumed rate of inflation;

assumed effective income tax rate;

number of years until desired withdrawal;

targeted periodic withdrawal amount; and targeted withdrawal period.

As with the retirement planning module 149, when seven of the above eight necessary inputs are known, the seventh can be calculated and shown via a graph in the main screen display 156. By observing the screen display 156, the user can visualize whether his/her objectives are being met and he/she can then vary (using the slider bars) or calculate the solution that will meet his/her objectives.

In particular, the main screen display 156 for the specific financial goal funding module 151 (FIGS. 8–12) comprises a beginning capital slider bar/window 171, additional periodic contribution slider bar/window 173, investment rate of return slider bar/window 175, inflation rate slider bar/window 177, effective tax rate slider bar/window 179, years to withdrawal slider bar/window 181, withdrawal period slider bar/window 183 and target withdrawal amount slider bar/window 185. A graph 187 is presented in the main screen display 156 which plots Assets ($) vs. Years.

Figure 8:
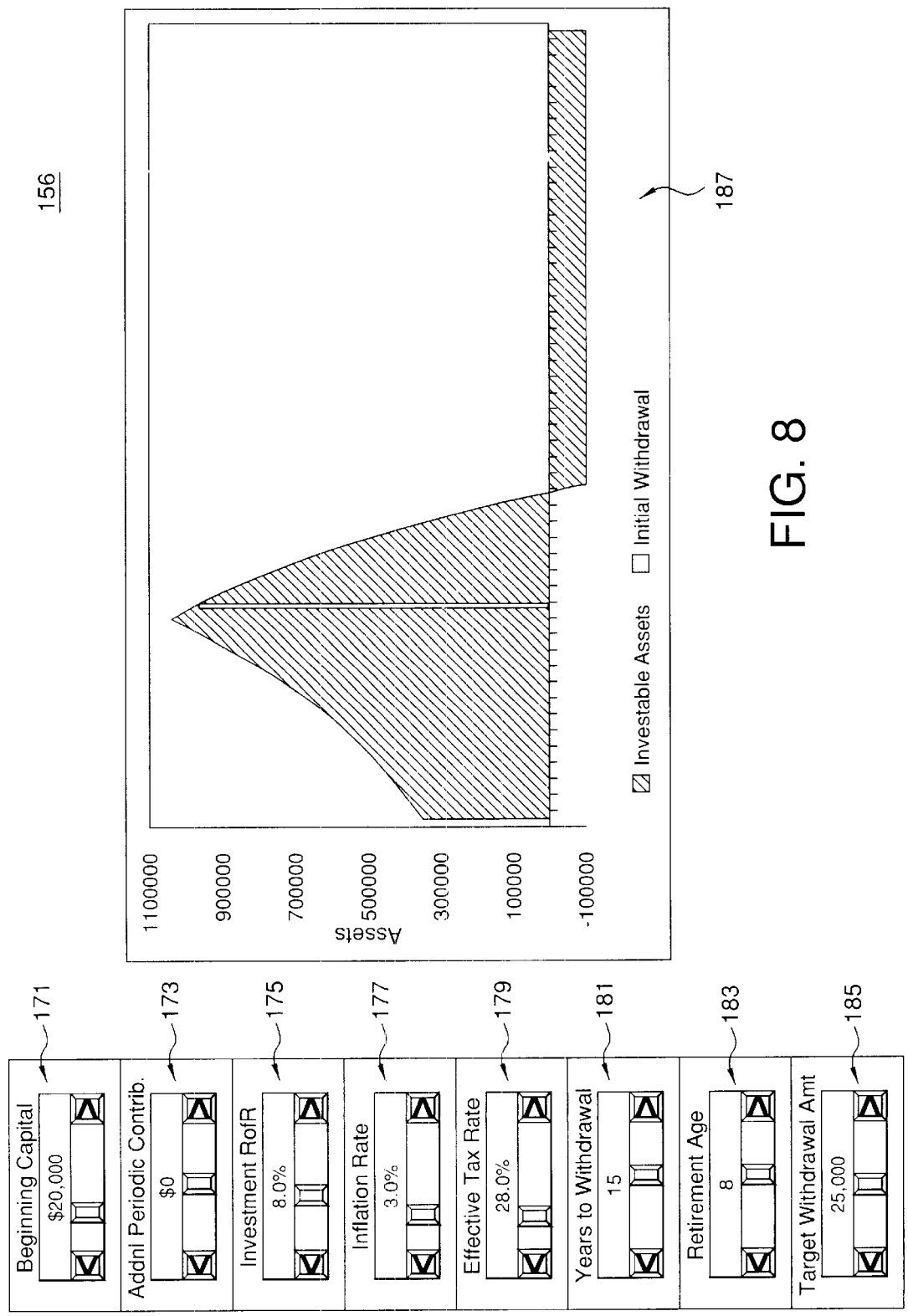
FIGS. 8–12 are main screen displays of an investment planning module depicting particular investment values.
Figure 9:
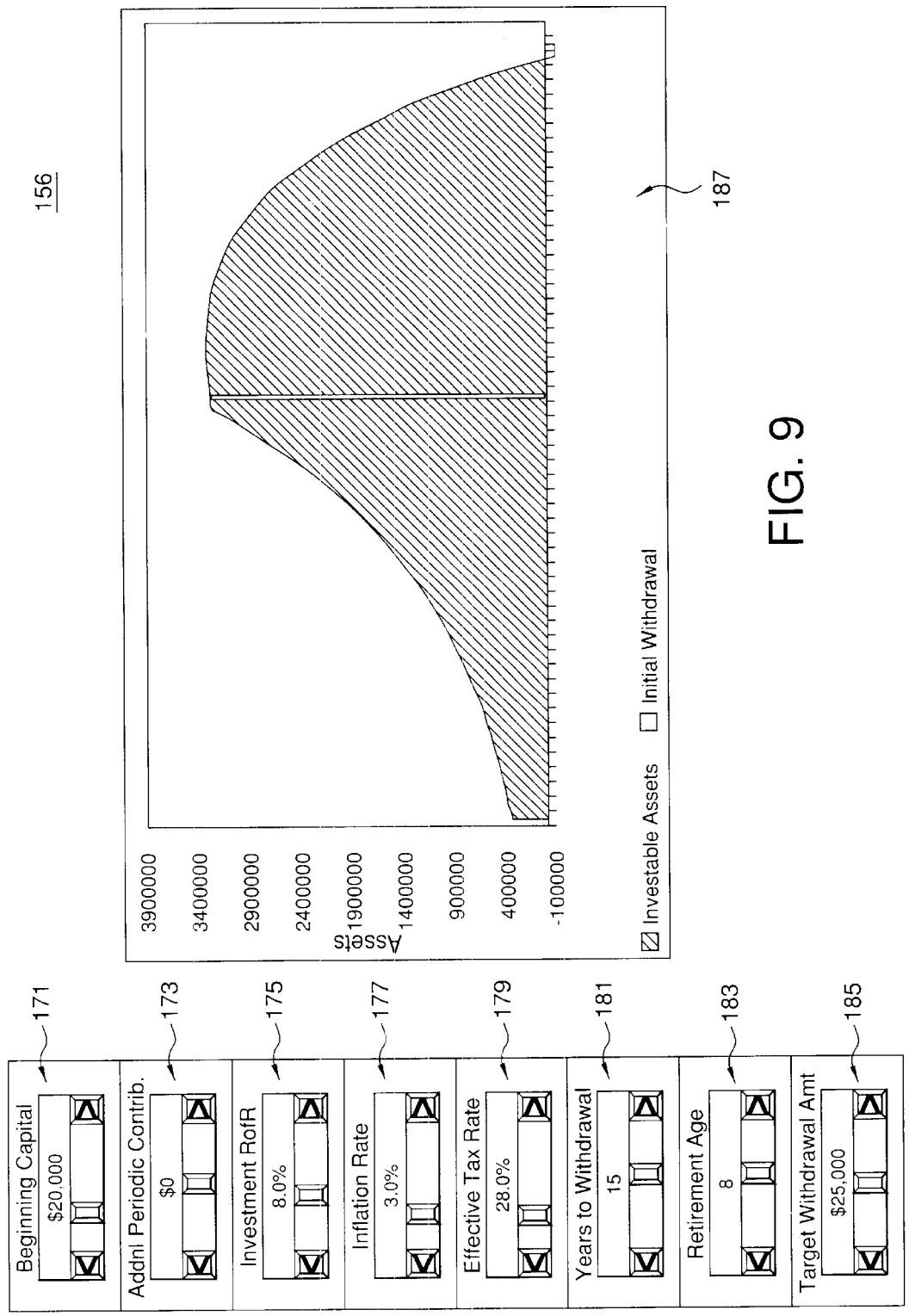
Figure 10:
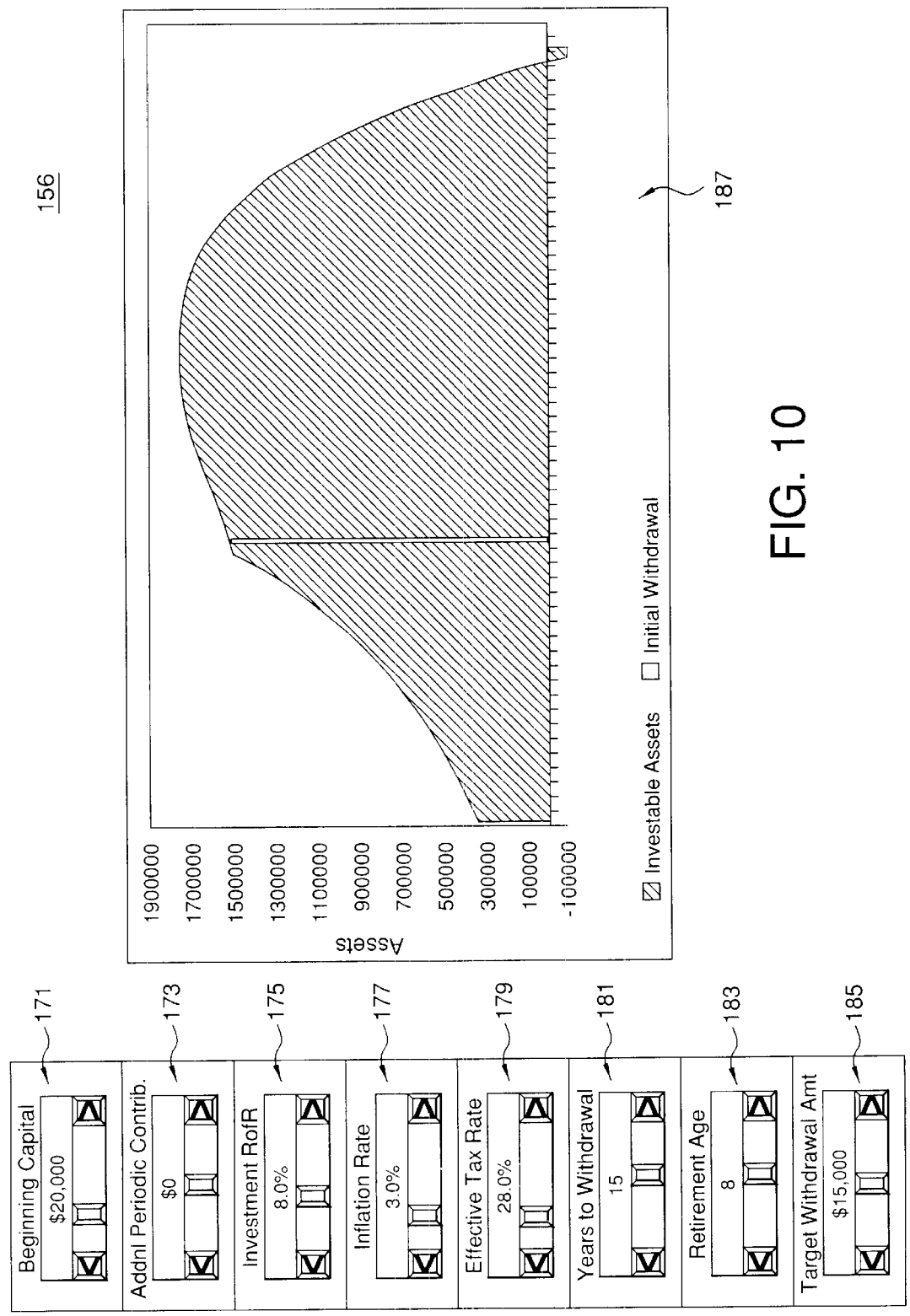
Figure 11:
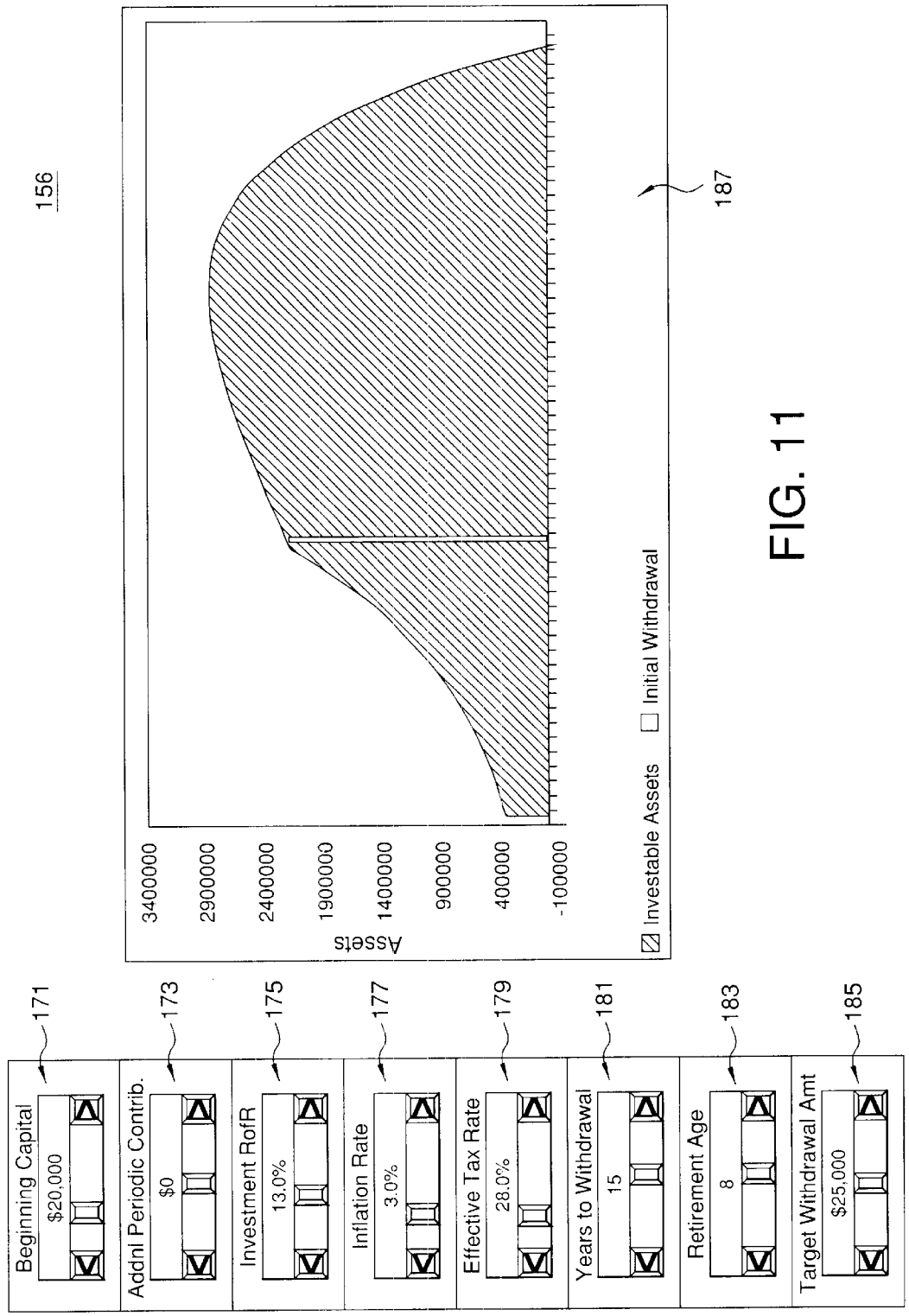
Figure 12:
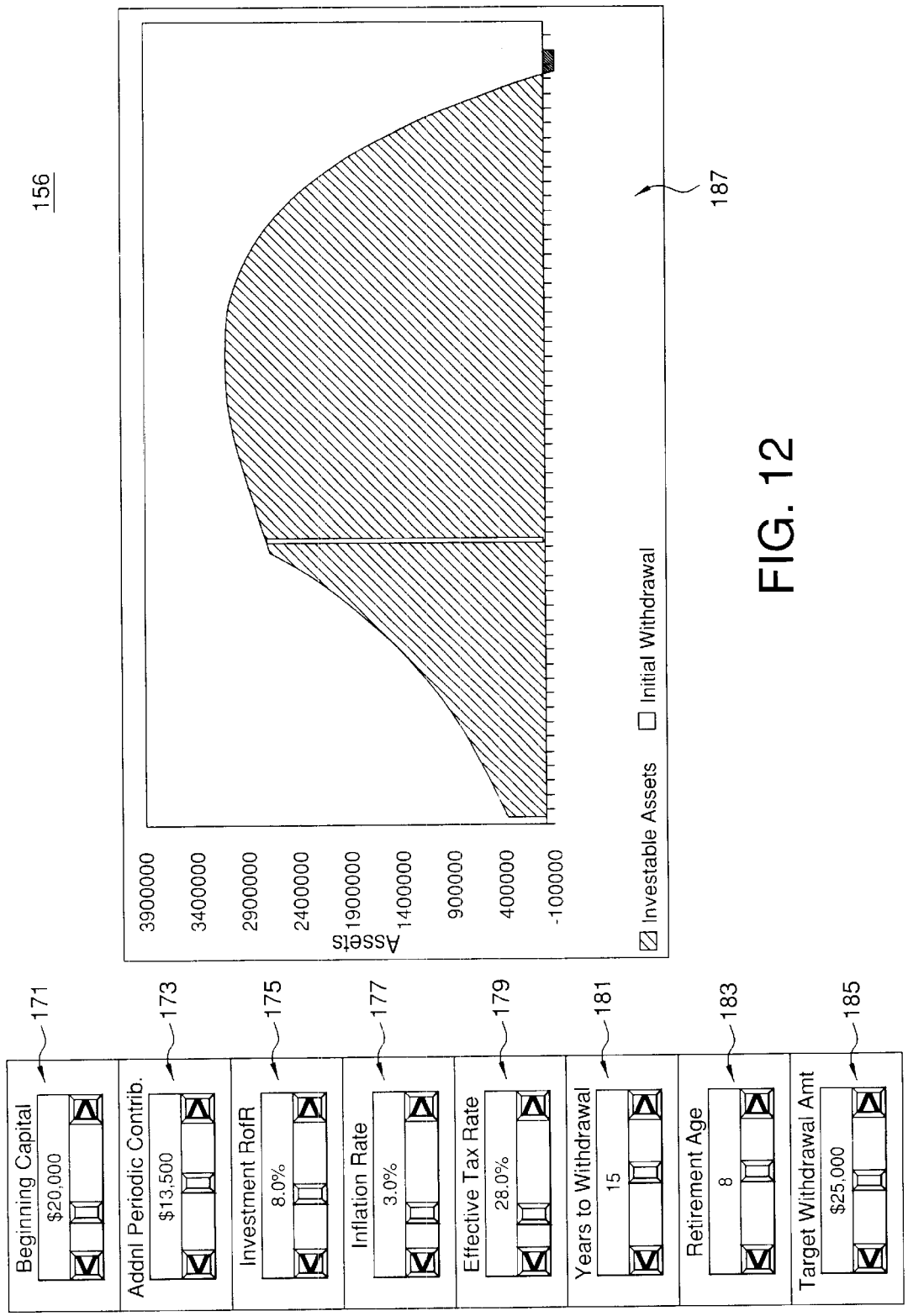

An example of how the risk, in investment planning (e.g., college investment), is exposed to the user and how the user uses the apparatus 120 to evaluate and then re-balance the risk according to his/her risk tolerance is shown in the sequence of FIGS. 8–12. In FIG. 8, given the particular values as shown in the slider bar/windows 171–185, that particular investment plan fails because the user cannot depend on accumulating sufficient college education funds at the current level of beginning capital, investment return and time frames. By clicking on the years to withdrawal slider bar/window 181, and given those particular values in the slider bar/windows 171–179, the apparatus 120 informs (FIG. 9) the user that no withdrawals can be made until 25 years from now. Since it is not practical to postpone the age at which a child enters college, the user wants to know at the child's targeted age 15 years from now, how much money will be available for college. The user then re-inputs a 15 year time requirement into the years to withdrawal slider bar/window 181 and clicks on the target withdrawal amount slider bar/window 185 (FIG. 10). A new calculation and graphic visualization is presented to the user, as shown in FIG. 10, which shows the compromise: 15 years from now the user may begin the first of eight withdrawals of $15,000.00/year. Next, the user may want to know what rate of return would provide all of his/her objectives. By clicking on the investment rate of return slider bar/window 175, the apparatus 120 indicates that a 13.0% (FIG. 11) rate of return must be achieved to have $25,000.00 of annual resources for college with the current level of assets and rates of return.

The user may then want to know what amount of monthly contribution is necessary now to achieve his/her goals with only a 8% investment assumption. The user then clicks on the additional periodic contribution slider bar/window 173; the apparatus 120 then shows (FIG. 12) that an additional $13,500.00 contribution per period is required.

Thus, the specific financial goal funding module 151 provides the user with immediate graphic feedback on the consequences of existing conditions (including existing assets, risk tolerance for investment allocations, tax rates, etc.) to the likelihood of accomplishing the original financial objectives. To the extent that the original expectation cannot be met, the user interactively and dynamically explores and calculates his options, such as accepting more investment return risk, assuming lower inflation, accepting a lower targeted objective; or, determines the necessity of additional contributions to funding accumulations.

FIGS. 13–16 depict the main screen displays 156 for the estate planning module 147. The risks in estate planning is having insufficient liquid assets to pay federal estate taxes and preserve assets intended for heirs, such as family businesses. Users need to see the trade-offs in using liquid assets to pay estate taxes so they can balance their tolerance for risk with the different risk-related options.

The estate planning module 147 utilizes the following parameters which can be an inputted by the user or can be a calculated value:

- the value of current assets in the estate, or the assumed value of future assets in the estate;
- assumed or desired rate of return;
- assumed rate of inflation;
- assumed life expectancy; and
- estate tax.

When four of the above five necessary inputs are known, the fifth can be calculated and shown via a graph in the main screen display 156. By observing the screen display 156, the user can visualize whether his/her objectives are being met and he/she can then vary (using the slider bars) or calculate the solution that will meet his/her objectives.

In particular, the main screen display 156 for the estate planning module 147 (FIGS. 13–16) comprises a current estate slider bar/window 189, future estate slider bar/window 191, investment rate of return slider bar/window 193, inflation rate slider bar/window 195, life expectancy bar/window 197 and estate tax bar/window 199. As will be discussed below, each main screen display 156 in the estate module also comprises a pair of horizontal bar charts. Each bar chart utilizes a novel arrangement of the estate assets in that it orders these assets from the most liquid asset (i.e., "cash", at the top) to the most non-liquid asset (i.e., closely-held business, at the bottom). As will be discussed below, this arrangement provides the user with an immediate appreciation of how these varying degrees of liquid assets are consumed at the death of the estate owner.

Figure 13:
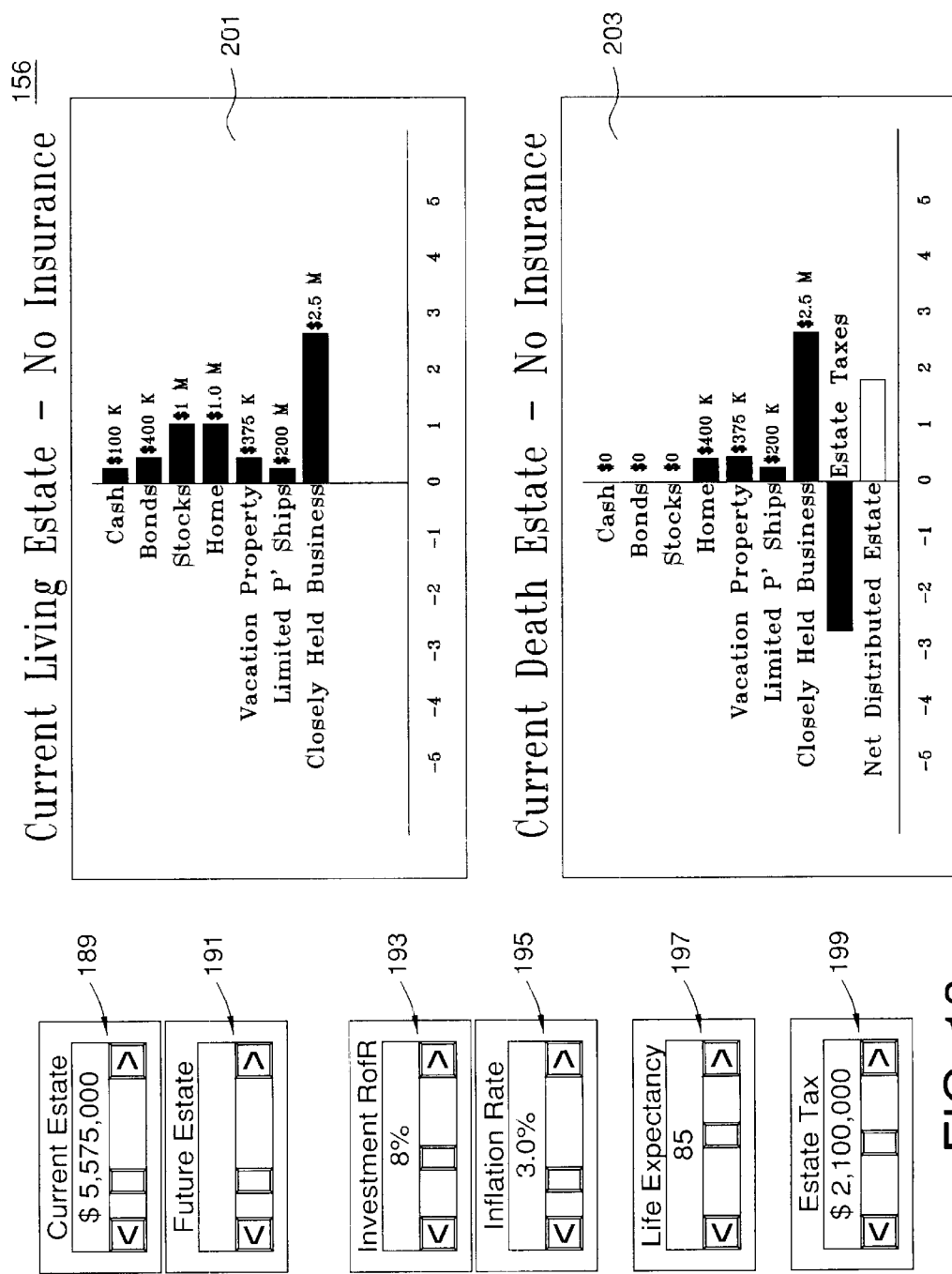

An example of how the risk, in estate planning, is exposed to the user and how the user uses the apparatus 120 to evaluate and then re-balance the risk according to his/her risk tolerance is shown in the sequence of FIGS. 13–16. In FIG. 13, an upper bar chart 201, entitled "Current Living Estate-No Insurance" depicts an exemplary estate with the most liquid asset, i.e., $100K in cash listed at the top of the chart the most non-liquid asset, i.e., a closely-held business worth $2.5M listed at the bottom of the bar chart 201; the horizontal axis are units of one million dollars and the axis is scalable. In this main screen display 156 of FIG. 13, it assumed that the estate owner has no life insurance. The lower bar chart 203 provides a display of what happens to those assets at the estate owner's death. As can be seen, to pay off the estate taxes, the most liquid assets, namely cash, bonds and stocks, were liquidated. Thus, the result of having no life insurance is a greatly-diminished net distributed estate. It should be noted that by dragging (with the cursor, not shown) the respective bar lines for different assets, the user can immediately see what assets would be necessary to be able to cover the estate taxes upon death of the estate owner and its effects on the net distributed estate.

In comparison, FIG. 14 also provides a pair of bar charts of the same exemplary estate of FIG. 13 but here the estate owner owned life insurance. In particular, the upper bar chart 205, entitled "Current Living Estate-with Insurance" depicts the exemplary estate with life insurance before death of the estate owner. The lower bar chart 207, entitled "Current Death Estate-with Insurance" depicts the estate after the death of the estate owner. The user can immediately appreciate the value of having the life insurance: the life insurance proceeds are used to pay off the estate taxes without affecting any of the estate assets; as a result, the net distributed estate is much greater than that depicted in FIG. 13. As discussed above with regard to FIG. 13, the user can also place the cursor (not shown) on the different bars and drag them to see the effects on the net distributed estate of changing any of the assets or life insurance.

Figure 16:
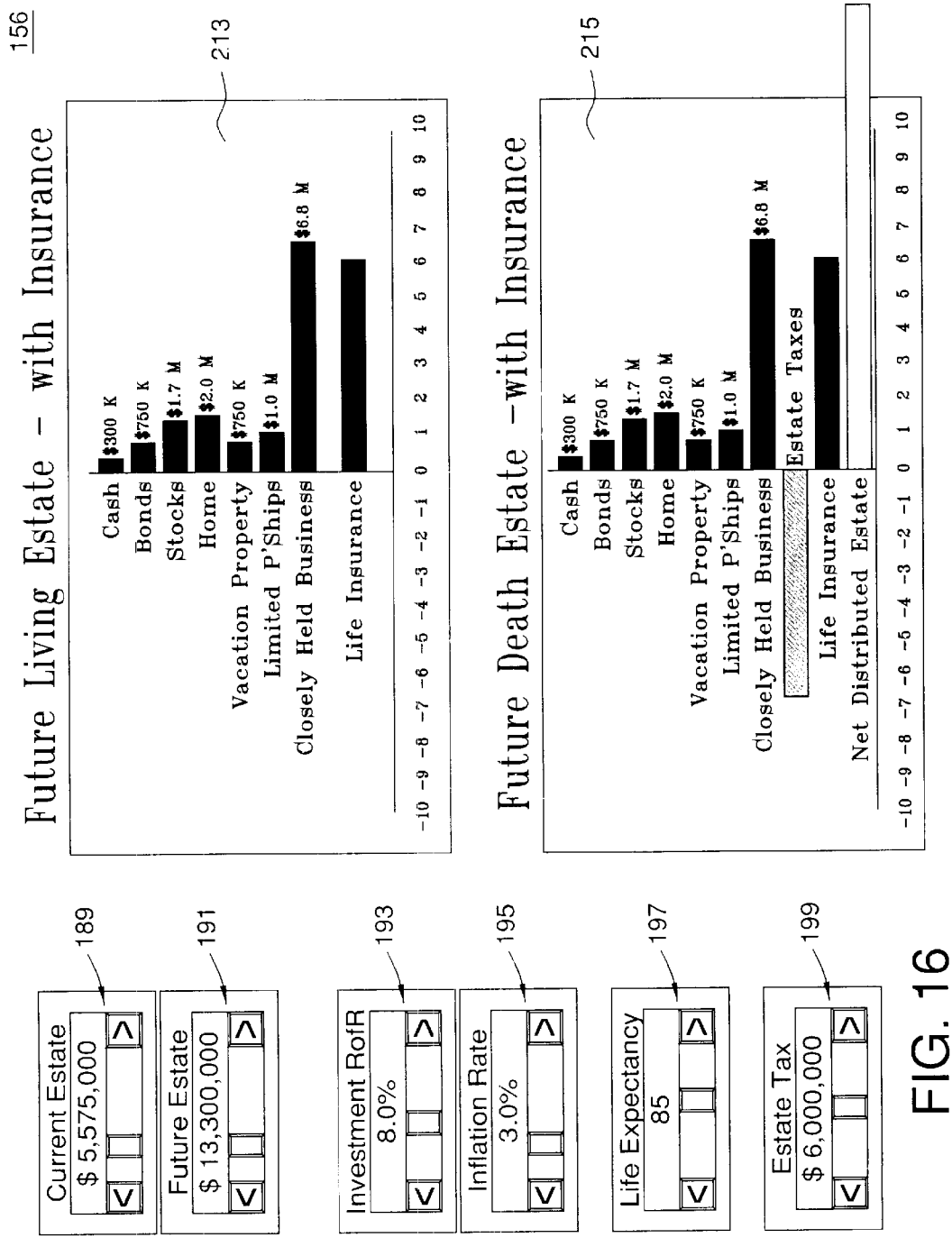

To more fully appreciate the importance of having life insurance, the life insurance module 145, via main screen displays 156 shown in FIGS. 15–16, presents the scenario where the estate owner lives another 20 years into the future before passing away. In particular, FIG. 15 comprises a pair of bar charts 209 and 211, entitled "Future Living Estate-No Insurance" and "Future Death Estate-No Insurance", respectively. As can be seen in FIG. 15, had the estate owner lived another 20 years still with no life insurance, then at his/her death, all the assets would be consumed to pay the estate taxes, leaving only the closely held business as the net distributed estate. On the other hand, as shown in FIG. 16, had the estate owner lived another 20 years with life insurance, all of the assets remain intact upon his/her death. In particular, the bar graph "Future Living Estate-Insurance" 213 indicates the estate of the estate owner just prior to his/her death 20 years into the future. The bar graph "Future Death Estate-Insurance" 215 shows that the net distributed estate includes all of the assets.

Thus, the estate planning module 147 provides the user with immediate graphic feedback on the consequences of existing conditions (including existing assets, risk tolerance for investment allocations, tax rates, and differences in investment liquidity, etc.) to the likelihood of accomplishing the planned net estate distribution. To the extent that the original expectation cannot be met, the user interactively and dynamically explores and calculates his/her options, such as accepting more investment return risk, assuming lower inflation, accepting a lower targeted objective and/or funding the liquidity and tax deficits with life insurance.

Figure 17:
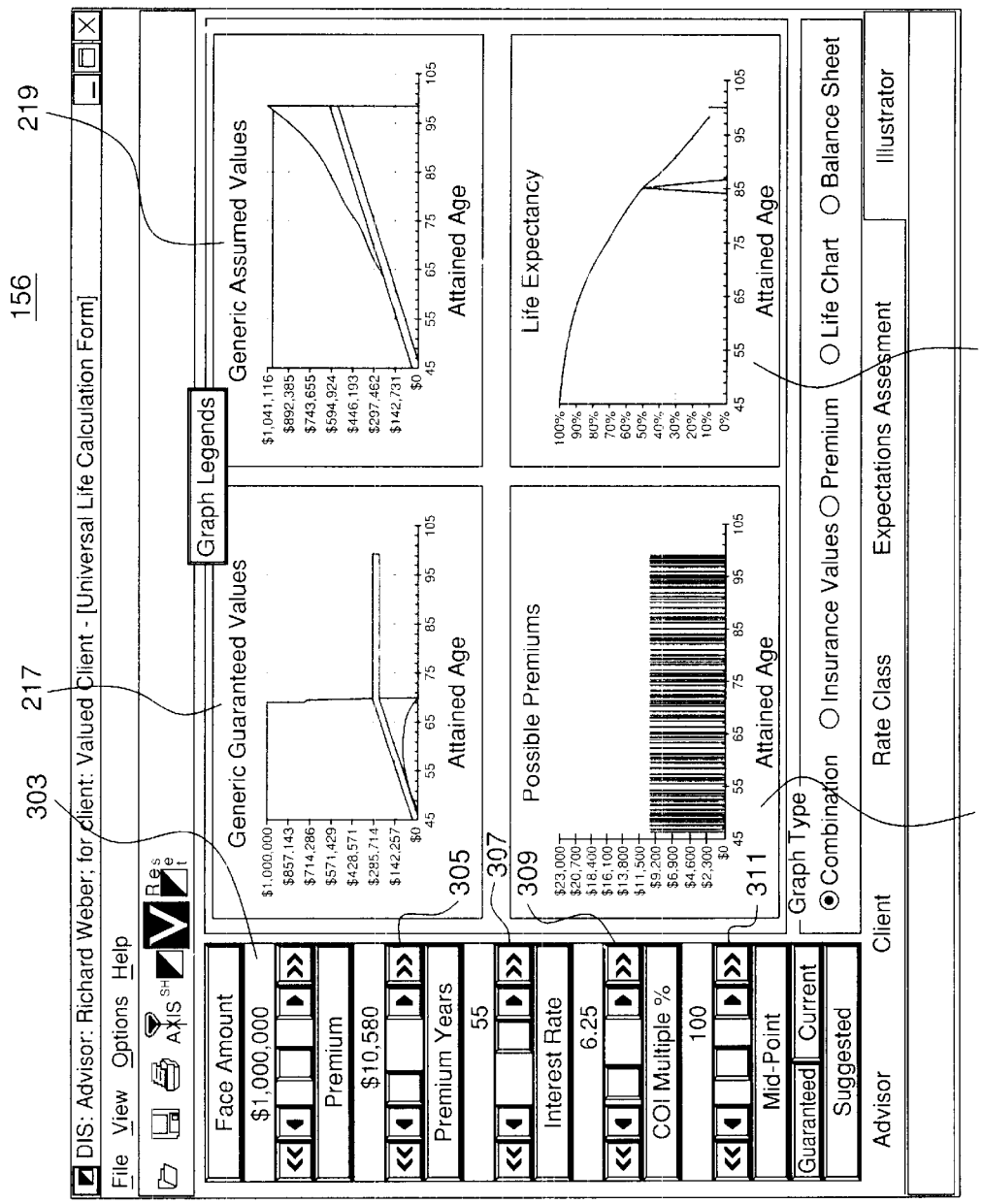
FIG. 17 is the main screen display of a life insurance planning module depicting particular life insurance values.

The life insurance module 145 includes all of the features and functions of the dynamic policy illustration system as disclosed in application Ser. No. 08/778,073. In addition, the life insurance module 145 also includes several new features and functions regarding life insurance. One example of these new features/functions is shown in FIG. 17. To that end, the main screen display 156 of the life insurance module 145 now presents four reduced-sized plots that can be viewed by the user simultaneously. In particular, the plot of "Generic Guaranteed Values" 217 is provided in the upper left of the display 156; the plot of "Generic Assumed Values" 219 is provided in the upper right of the display 156; in the lower left of the display 156 is the plot for "Possible Premiums" 221; and in the lower right of the display 156 is the plot for "Life Expectancy" 223. The main screen display 156 for the life insurance module also includes a face amount slider bar/window 303 (similar to the slide bar 72A/data field 74A of application Ser. No. 08/778,073), a premium slider bar/window 305 (similar to the slide bar 72B/data field 74B of application Ser. No. 08/778,073), a premium years slider bar/window 307 (similar to the slide bar 72C/data field 74C of application Ser. No. 08/778,073), an interest rate slider bar/window 309 (similar to the slide bar 72E/data field 74E of application Ser. No. 08/778,073) and a cost-of-insurance (COI) slide bar/window 311. As the user modifies one of the variables using the slider bar/windows 303–311, all of the plots provide a dynamic depiction of the effects of that modification. Thus, the user is provided with a comprehensive understanding of the risk inherent in the policy as the variable(s) is changed and the respective plot re-configures. In addition, the user still has the option of selecting one of the four plots to view by itself (as an example, see FIG. 19).

Figure 19:
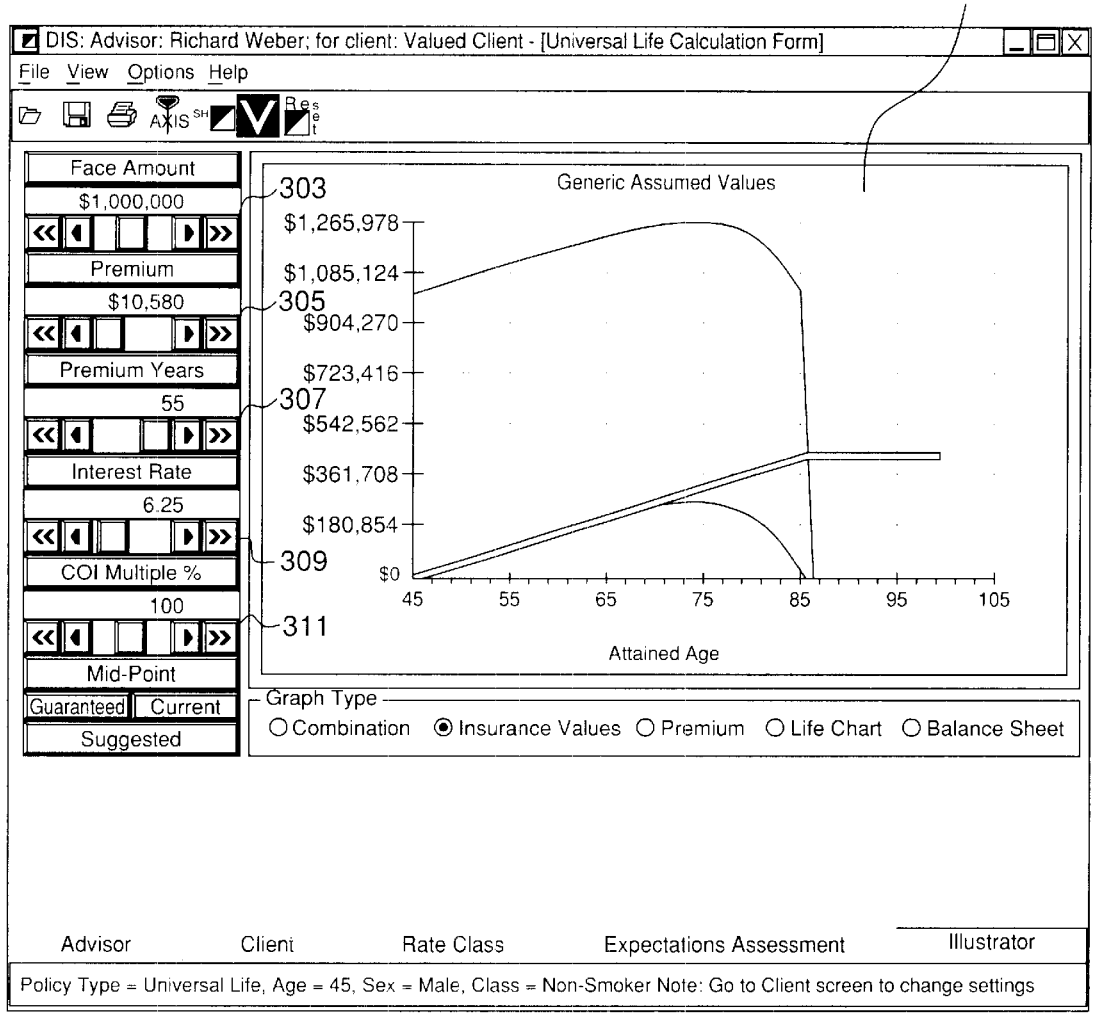
FIGS. 19–20 are main screen displays of the increasing death benefit sub-module.

Another new feature incorporated into the life insurance module 145 is the introduction of five sub-modules, as set forth in FIG. 19. An increasing death benefit sub-module 313, a $1^{st}$ year extra premium sub-module 315, a varying premiums sub-module 317, a withdrawals sub-module 319 and an in-force sub-module 321.

Figure 18:
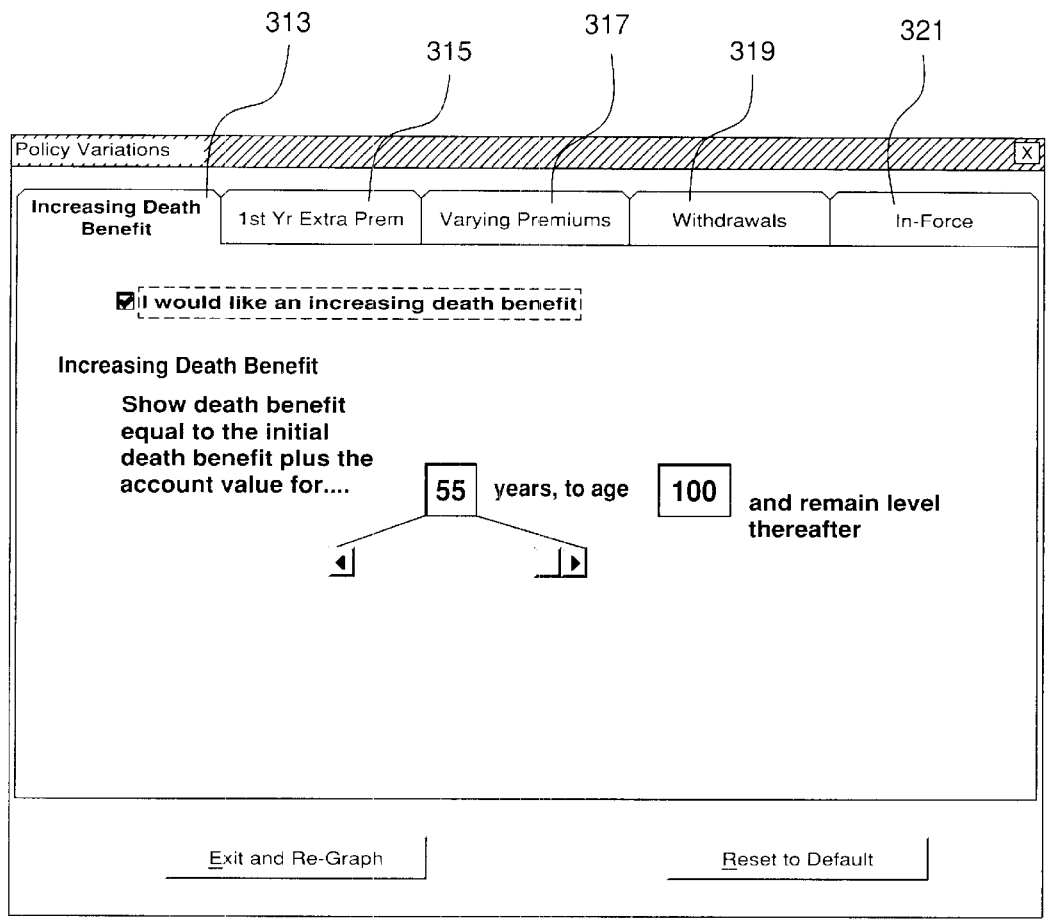
FIGS. 18 is the input screen display for the increasing death benefit sub-module.
Figure 20:
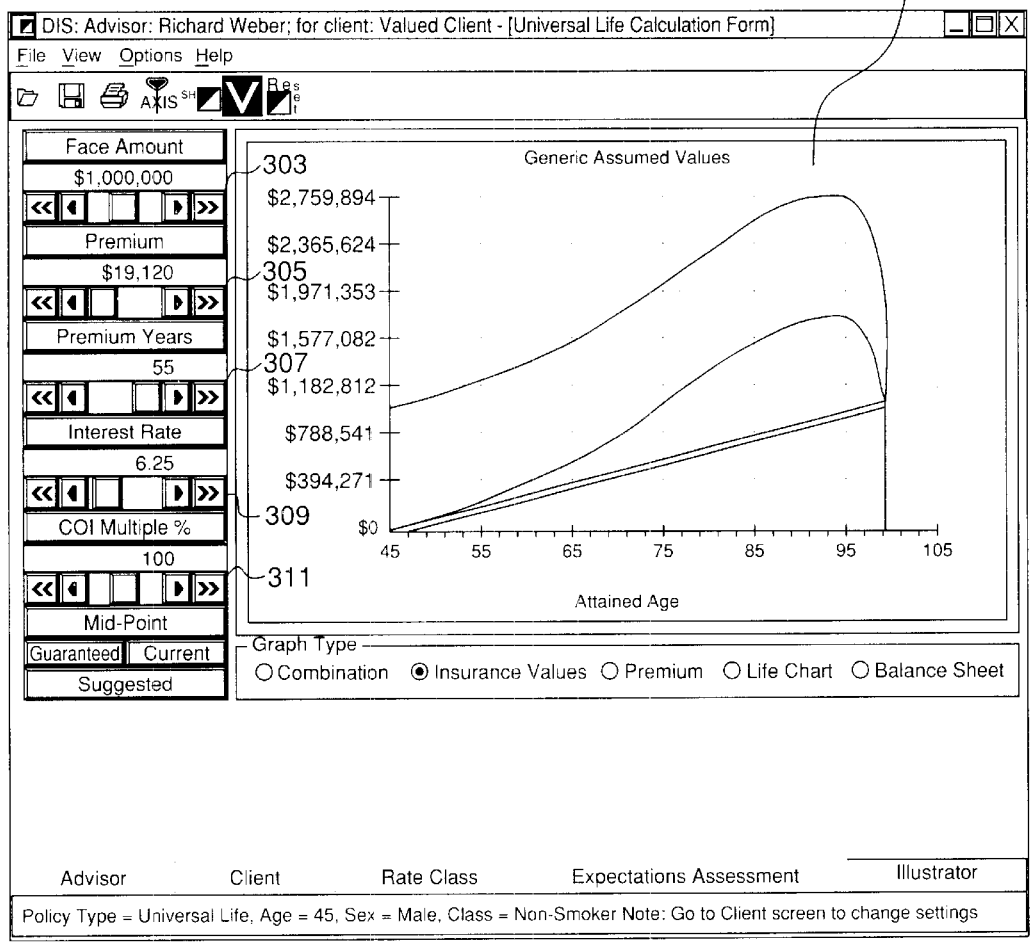

An example of the increasing death benefit sub-module 313 is shown in FIGS. 18–20. As an alternative to graphically displaying and calculating a LEVEL death benefit, an INCREASING death benefit can be selected for any number of years. As shown in FIG. 19, when re-graphing the selected number of INCREASING death benefit years, the premium of $10,580, which is sufficient to support a LEVEL death benefit, is not sufficient at the current assumptions to support an INCREASING death benefit. Thus, there is greater risk in assuming that the original premium can support a greater benefit. In order to determine the appropriate premium to support the INCREASING death benefit, and reduce the risk of sufficiency, the user clicks on the word PREMIUM and finds (as shown in FIG. 20) that it will take $19,120 per year to reduce the sufficiency risk and increase the chances that the selected benefit can be accomplished.

Figure 22:
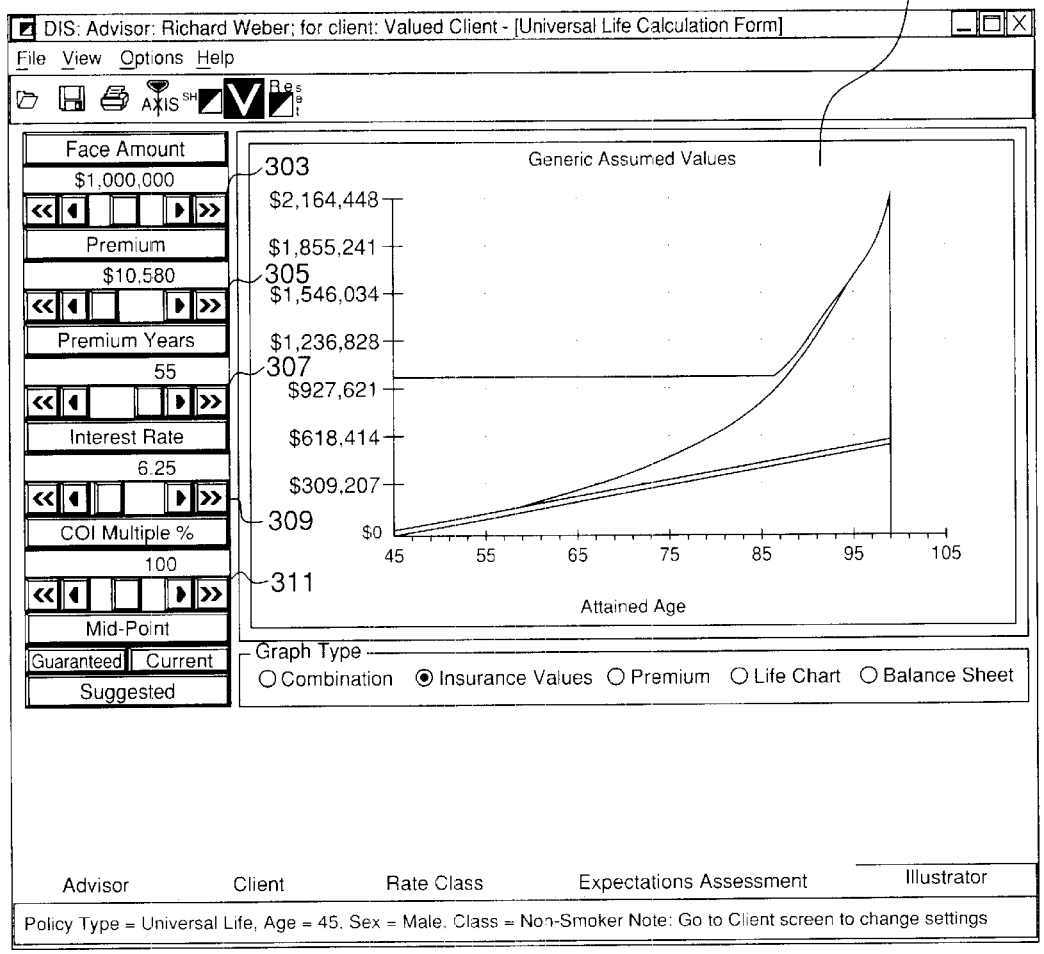
FIGS. 22–23 are main screen displays of the $1^{st}$ year extra premium sub-module.
Figure 23:
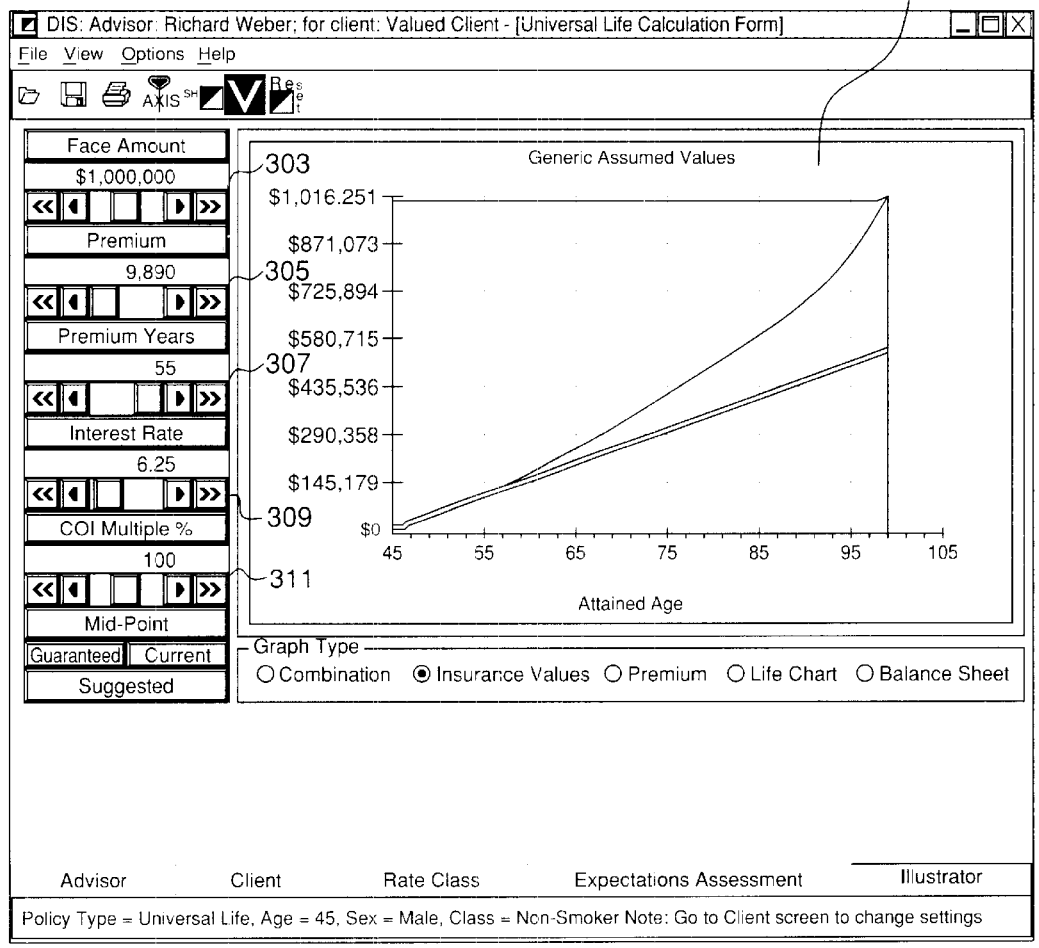
Figure 24:
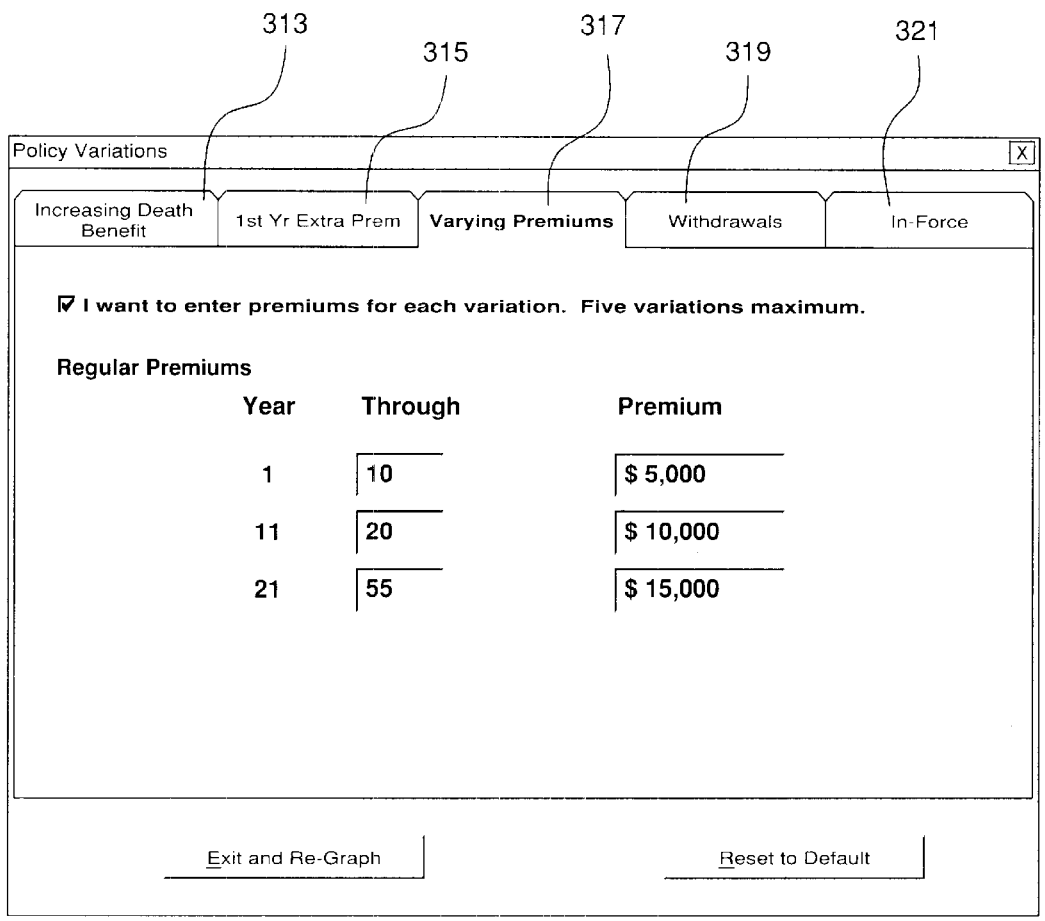
FIG. 24 is the input screen display for the varying premiums sub-module.

An example of the $1^{st}$ year extra premium sub-module 315 is shown in FIGS. 21–23. This sub-module allows an EXTRA premium to be paid into the policy in the first year, in addition to the regular, annual premium. (This could be the result of replacing an older policy with a newer one and "rolling" the cash values from the old to the new). As shown in FIG. 22, if an additional $10,000 is paid into the policy in the first year, in addition to the "normal" premium of $10,580, then there will be additional benefit accruing at age 85 in the form of additional death benefit and cash value. On the other hand, due to the additional money in the policy, it is possible to calculate a lower annual premium by clicking on the word "PREMIUM" and determining, as shown in FIG. 23, that the annual premium could be reduced to $9,890 (with the current assumptions).

Figure 25:
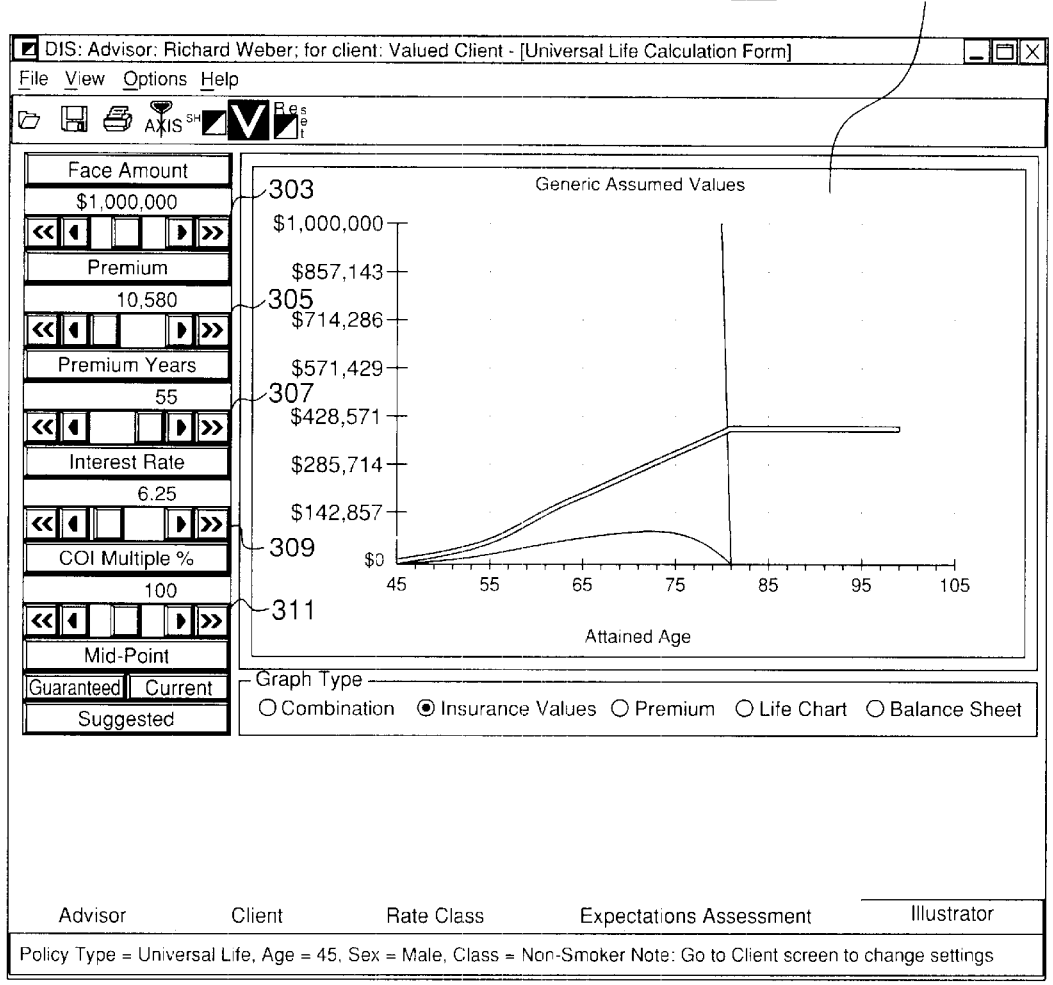
FIG. 25 is a main screen display of the varying premiums sub-module.
Figure 26:
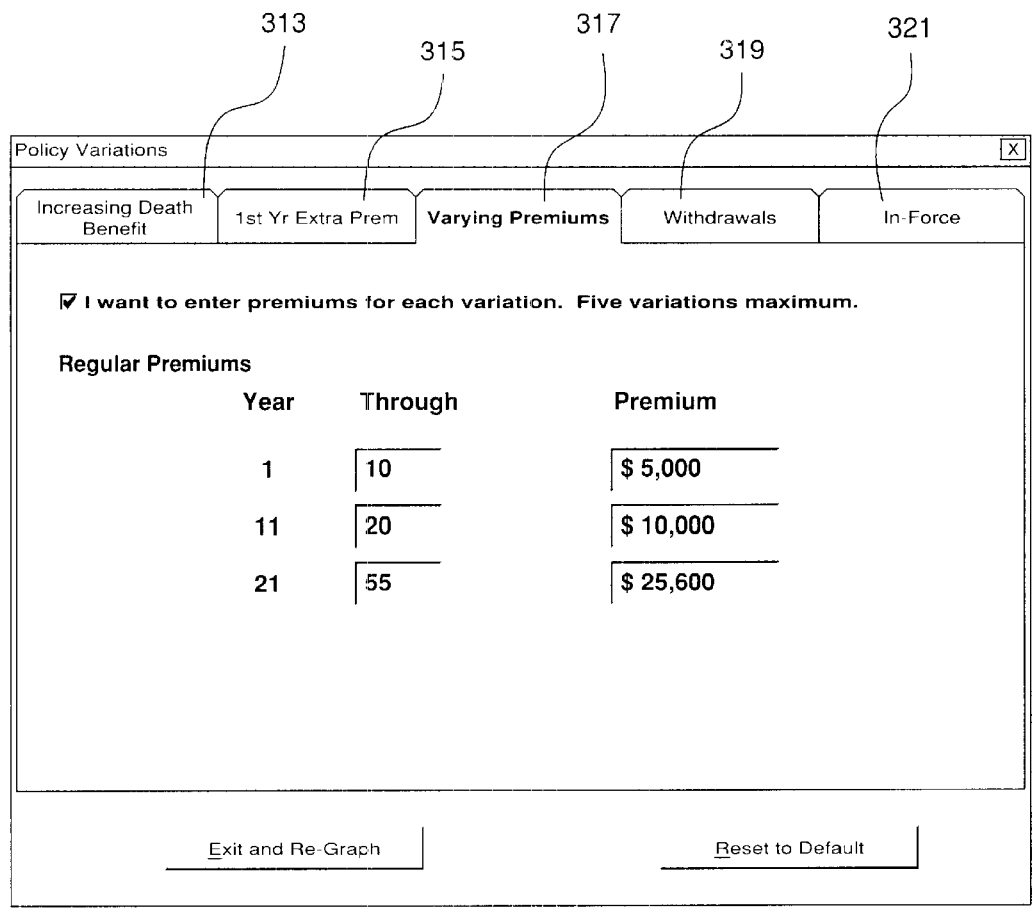
FIG. 26 is the input screen display of FIG. 24 having the premium modified by the user.
Figure 27:
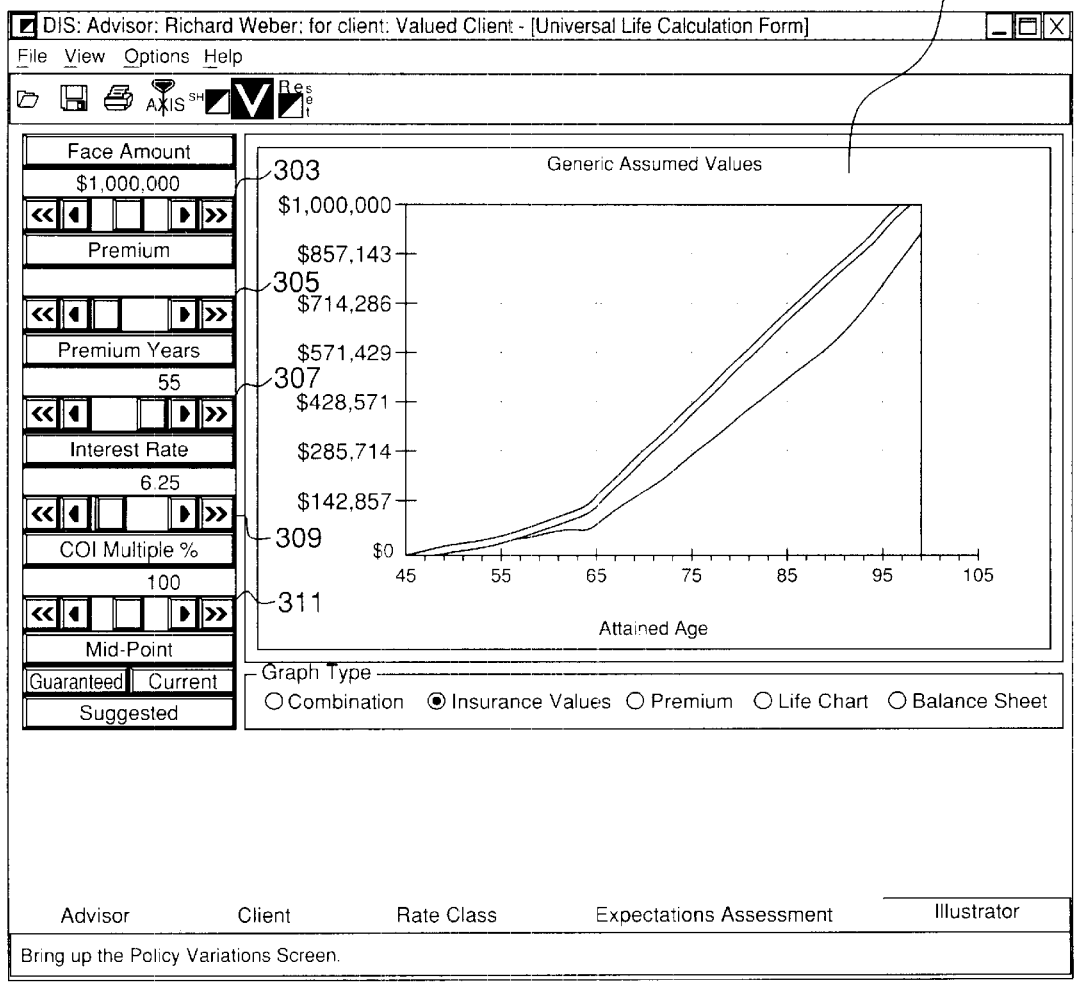
FIG. 27 is a main screen display of the varying premium sub-module as modified by the user to make the policy sufficient.

An example of the varying premiums sub-module 317 is shown in FIGS. 24–27. In the varying premiums sub-module 315 (FIG. 24), the user can override the PREMIUM CALCULATION feature and specify the premiums. This allows the user to explore the risk associated with the premiums he/she wishes to pay. In FIG. 25, the premiums specified are inadequate to support the policy beyond age 81. In order to assure sufficiency of premiums paid, the user returns to the VARYING PREMIUM INPUT screen (FIG. 26) and increases the specified premium until he/she finds the pattern of premiums (FIG. 27) that makes the policy sufficient at current assumptions (and, thereby, reducing the risk that the policy will lapse before the insured dies).

Figure 28:
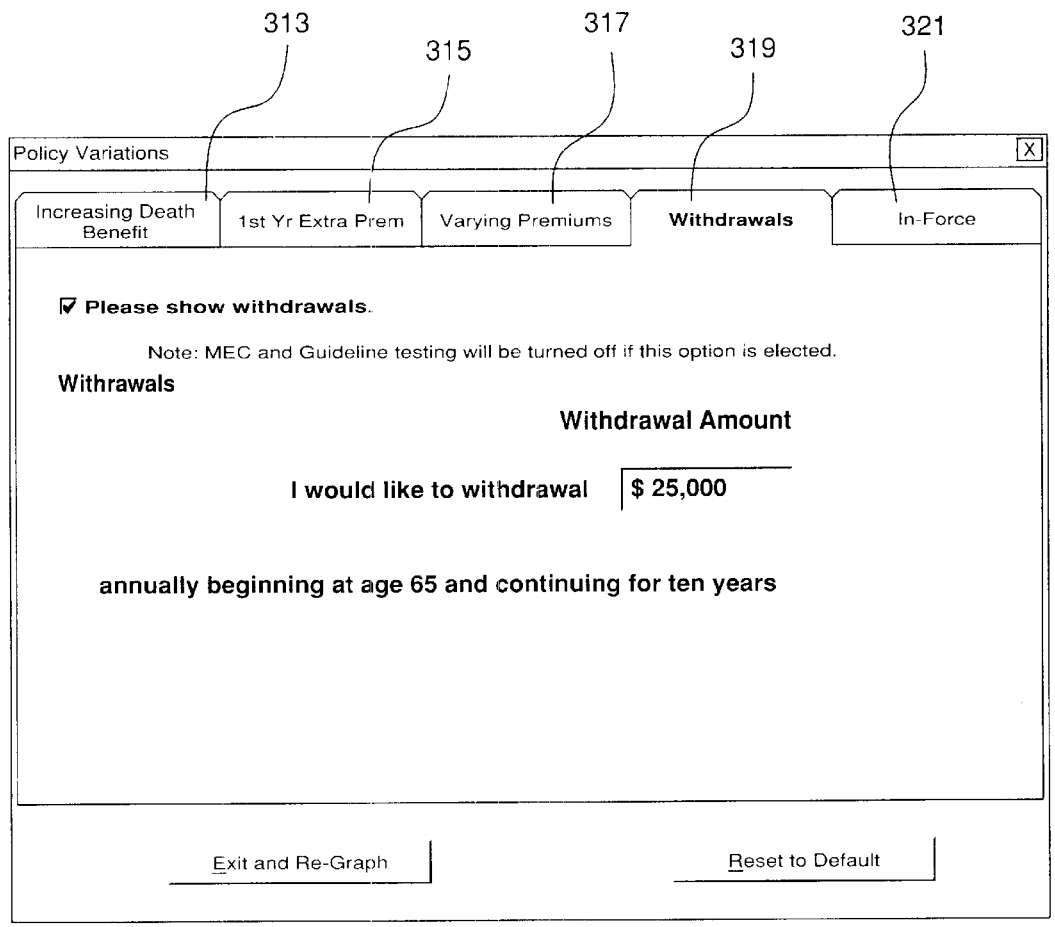
FIG. 28 is the input screen display for the withdrawals sub-module.
Figure 29:
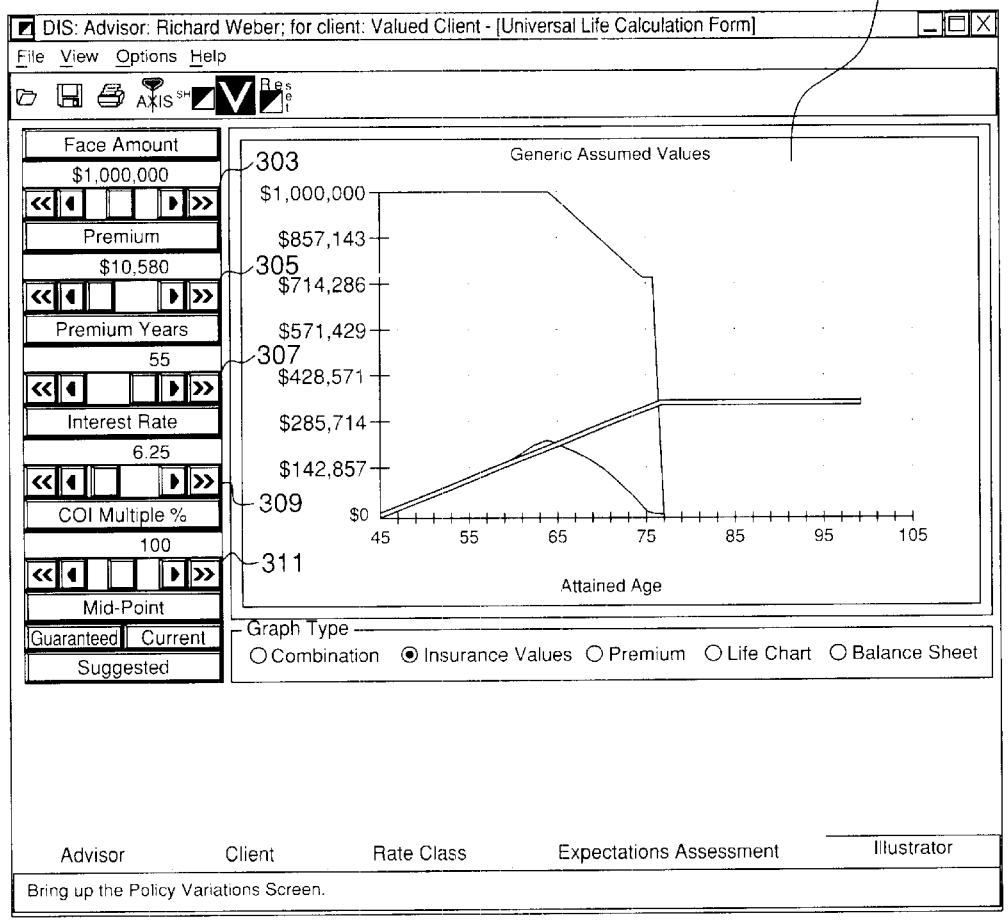
FIGS. 29–30 are main screen displays of the withdrawal sub-module;.
Figure 30:
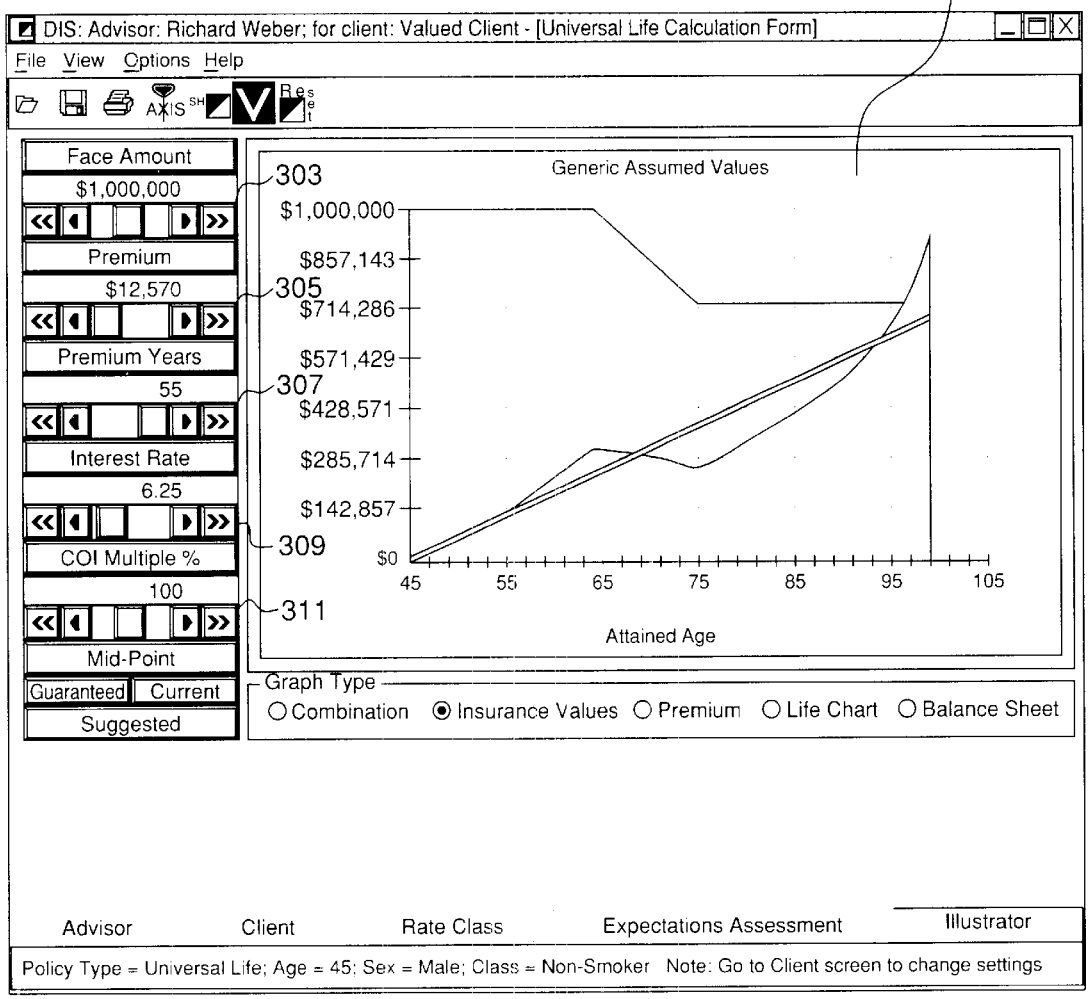
Figure 31:
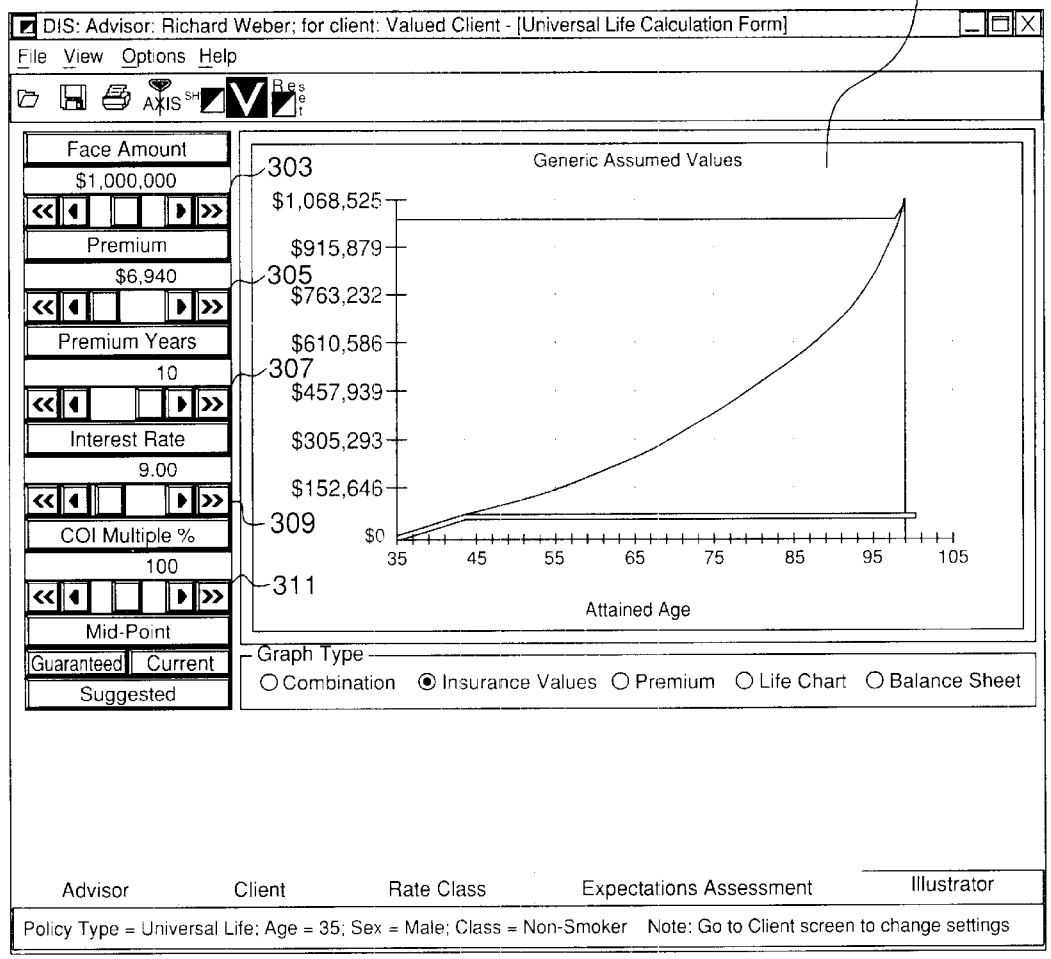
FIG. 31 is a main screen display for the in-force sub-module.

An example of the withdrawals sub-module 319 is shown in FIGS. 28–30. In the withdrawals sub-module 317 (FIG. 28), the user is permitted to specify a certain withdrawal of cash values beginning at age 65, to be withdrawn annually for 10 years. However, as shown in FIG. 29, making a total of $250,000 in withdrawals with the original premium will cause the policy to lapse at age 77. Therefore, by the user clicking on the word PREMIUM (i.e., slider bar/window 305), the withdrawals sub-module 319 determines the amount of additional premium ($1,990/year) required to keep the policy in force and provide the desired 10 annual withdrawals beginning at age 65.

Figure 32:
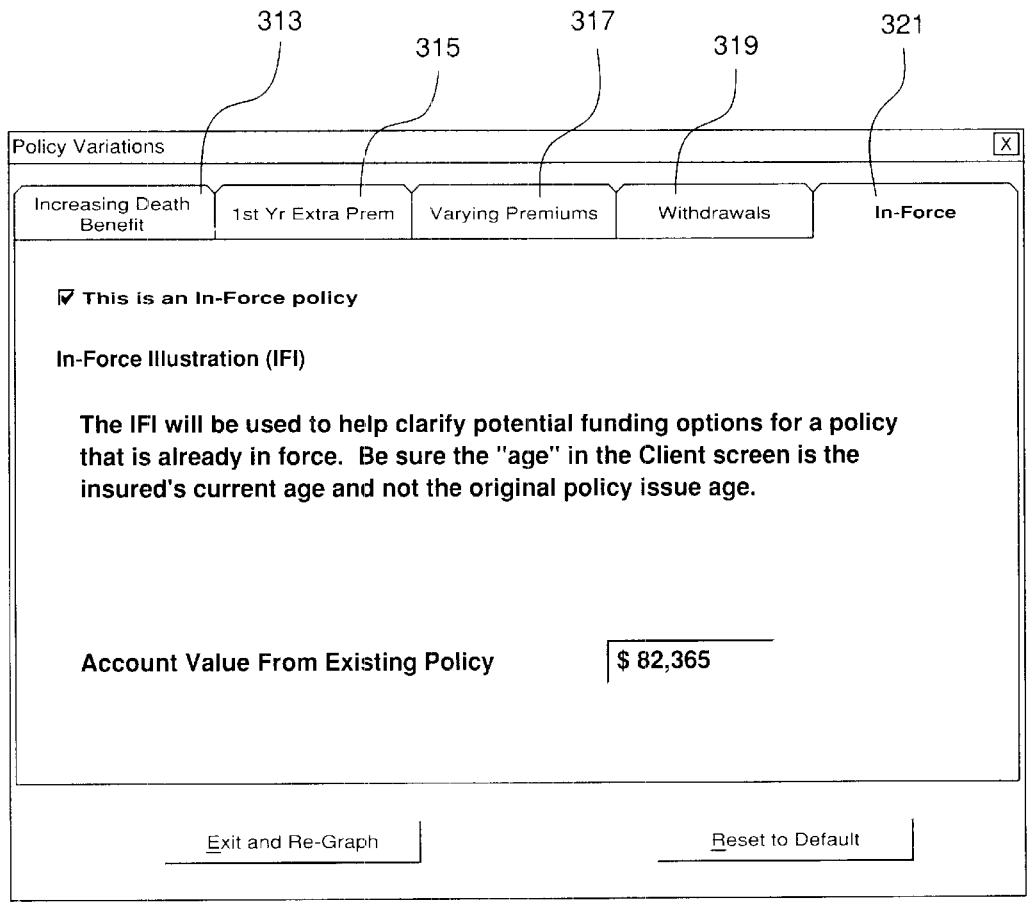
FIG. 32 is the input screen display for the in-force sub-module.
Figure 33:
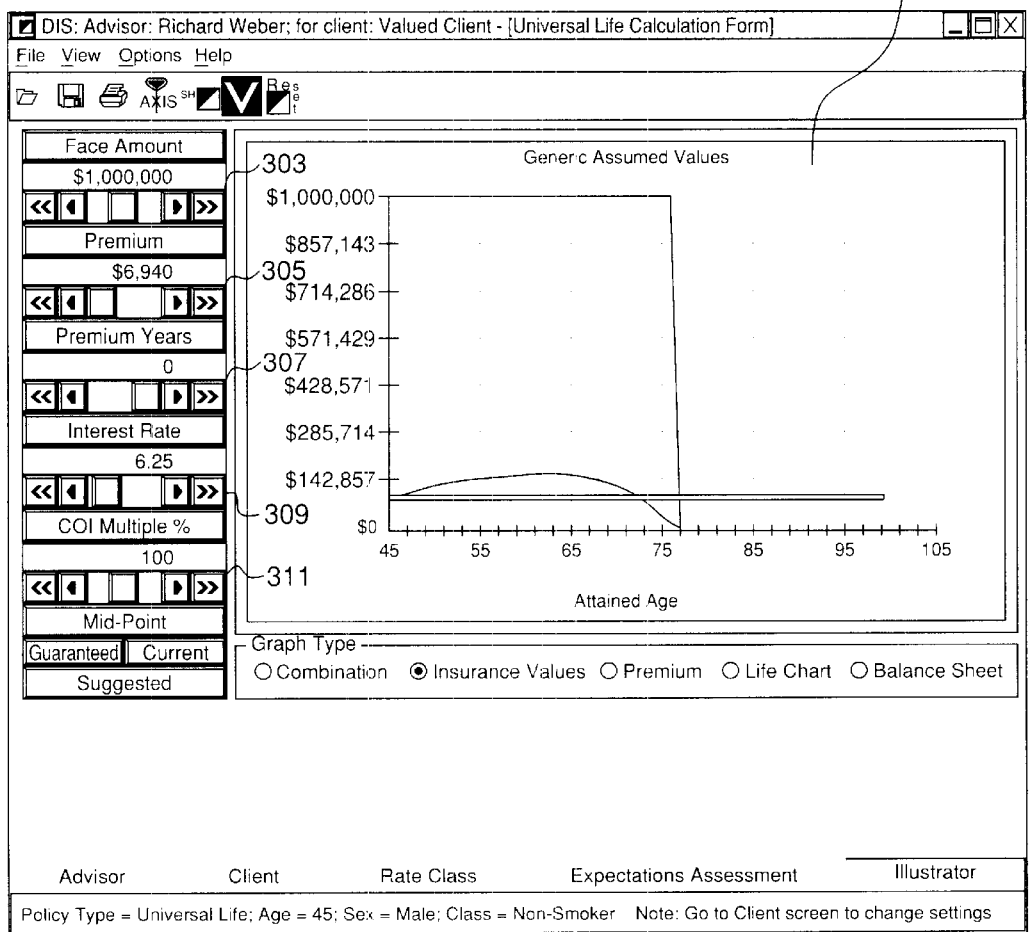
FIGS. 33–36 are main screen displays for the in-force sub-module.
Figure 34:
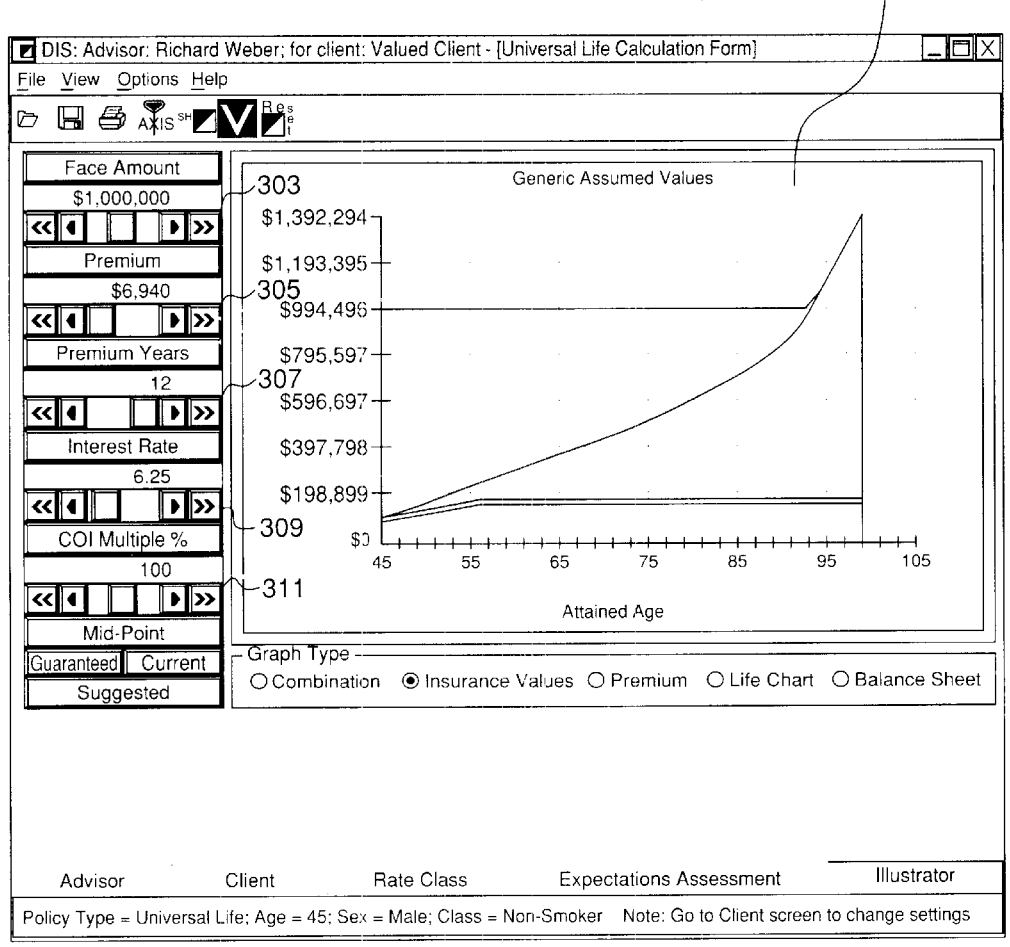
Figure 35:
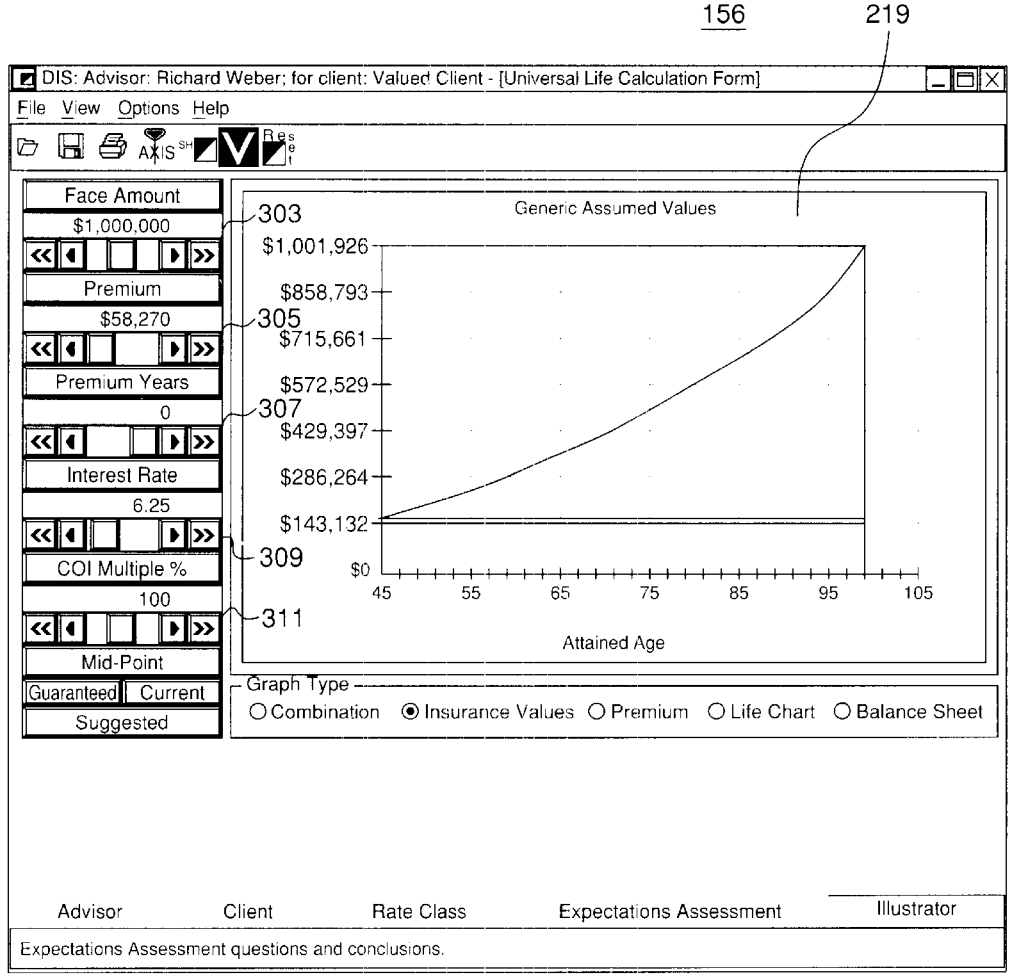
Figure 36:
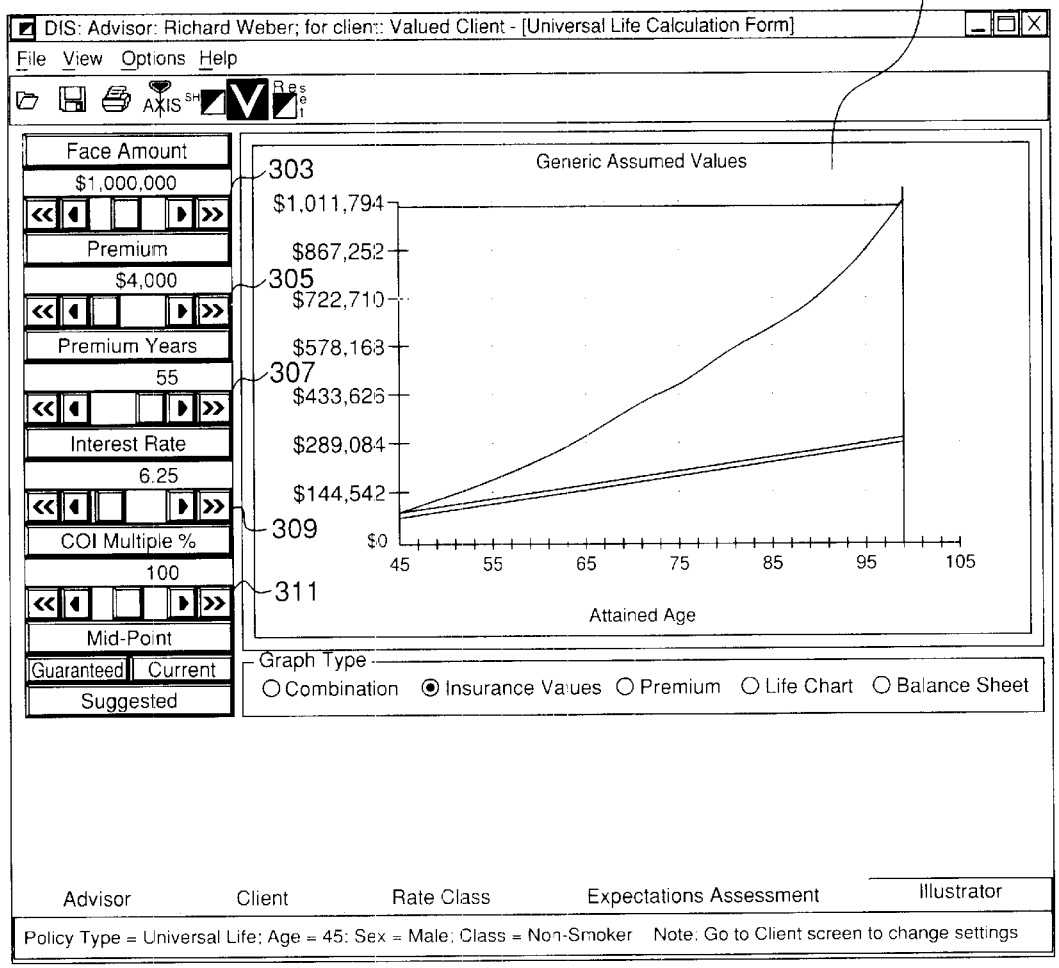

An example of the in-force sub-module 321 is shown in FIGS. 31–36. The in-force sub-module 321 provides a test for an existing policy against its original assumptions. In particular, a user purchased a universal life policy 10 years ago. His/her expectation was that he/she would pay $6,940/year for 10 years and would then not have to pay any further premiums. At the time he/she bought the policy, the interest crediting rate for the policy was 9% and the expected cash value at age 45 was $87,500. To use this module 321, the user only needs to indicate his/her present age on the CLIENT screen (see FIG. 23 of application Ser. No. 08/778,073), and the Account Value From Existing Policy on the IN-FORCE-INPUT screen (FIG. 32). Due to the lower interest rates in the last 10 years, the current cash value is $82,365 which is less than the originally expected value of $87,500. When the user clicks on the "Exit and Re-Graph" button (FIG. 32) while in the main screen display 156 (FIG. 33) setting the premium to the originally expected $6,940 (using the Premiums slider bar 305) for 0 more years (using the Premium Years slider bar 307) at the current interest rate of 6.25% (using the Interest Rate slider bar 309), the user visualizes the risk in the current policy: the policy will likely lapse at age 77 if he/she does not take action to mitigate that risk.

One way to mitigate the risk is to pay the $6,940 for more years. By clicking on the Premium Years button 325 (FIG. 34), the in-force sub-module 321 determines that 12 more annual payments ($6,940/year) will put the policy back into balance and thereby better assure the sufficiency of the policy.

Alternatively, the user can determine the single dollar amount of $58,270 (FIG. 35) that will place the policy back into balance and better assure the sufficiency of the policy. Another alternative is that the user can determine the annual dollar amount (FIG. 36) of $4,000 that will also place the policy back into balance and thereby better assure the sufficiency of the policy.

Figure 38:
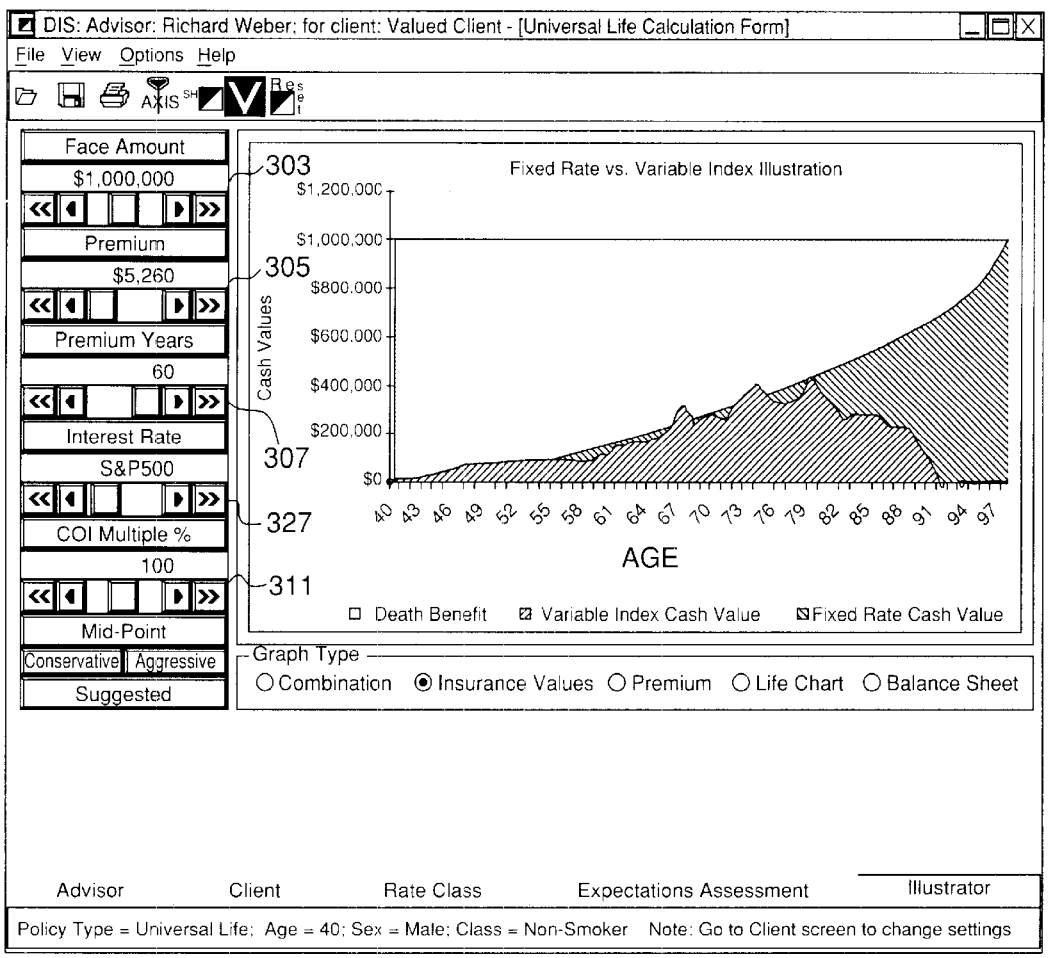
Figure 39:
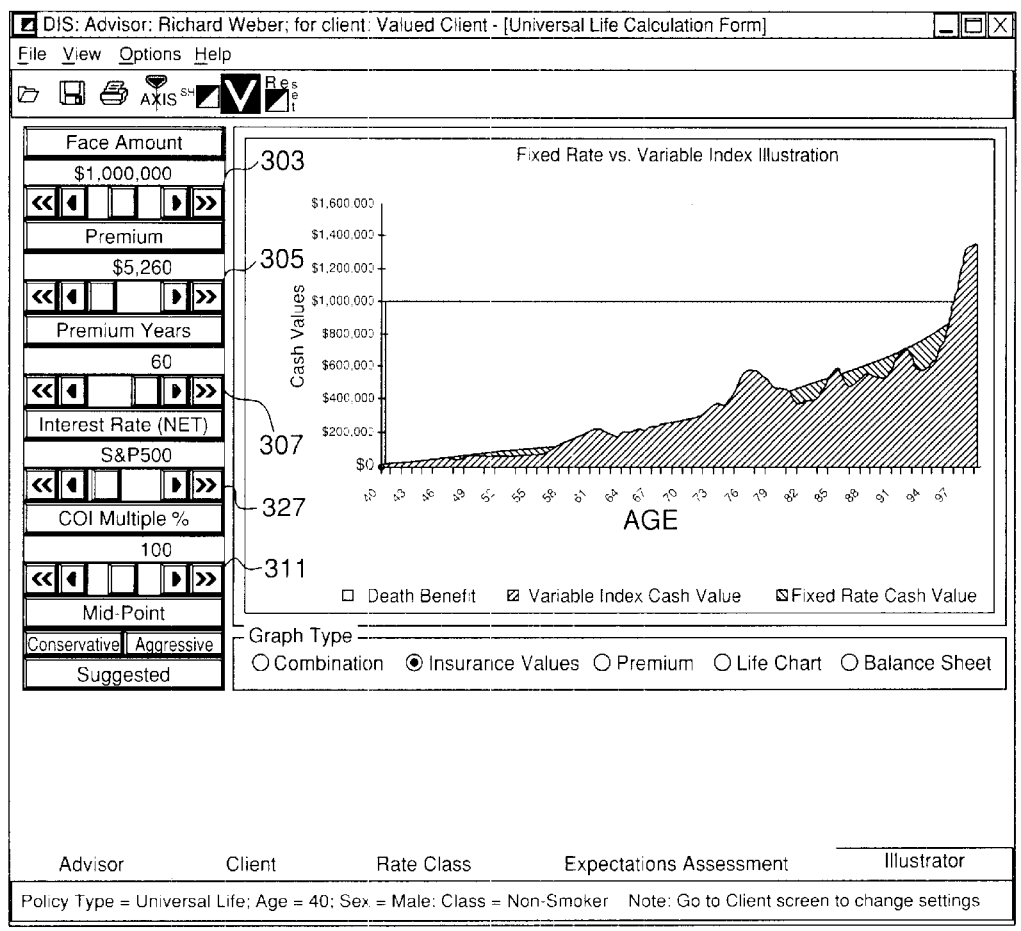

As mentioned earlier, the S&P500® module 400 provides a more sophisticated variation of estimating future investment appreciation for all of the financial planning modules 145–151. As used with the life insurance planning module 145, the S&P500® module 400 provides an alternative for the fixed interest rate assumption in the Interest Rate slider bar/window 309, the S&P500® module 400 applies a series of annual continuous, or random historical S&P500® investment returns to the calculation of cash value and/or premium. In fact, the interest rate slider bar/window 309 has been replaced by an Interest Rate (NET) slider bar/window 327, as shown in FIGS. 37–39.

To best understand the S&P500® module 400 operation, the following example (FIGS. 37–39) is used with the life insurance module 145 and, in particular, with respect to a variable life insurance policy. However, it should be repeated that this is by way of example, not limitation, and that use of the S&P500® module 400 is available for use in all the modules 145–151 for estimating future investment appreciation.

As used with the life insurance planning module 145, the purpose of S&P500® module 400 is to reveal the risk inherent in any variable life insurance illustration which utilizes a static rate of return as the basis for calculating future policy values since the stock market does not increase, or decrease, in constant values over time. When showing the application of historic continuous, or random, annual returns of the S&P500® to a graphic plot overlaid on the area graph (see FIGS. 37–39), the difference between utilizing an unvarying investment return versus the more "real" ups and downs of the stock market becomes apparent. The ability to dynamically vary the S&P500® returns quickly demonstrates that higher, not lower, premiums are the key to success in the real World of variable life insurance policies. As used with the life insurance module 145, the purpose of the S&P500® sub-module is to enable more sophisticated variations than available in the main life insurance module 145. The variations include: 1) the ability to have calculated and dynamically illustrate an increasing death benefit for a specified period of years; 2) allow a one-time "pour-in" of cash into a policy; 3) bypass the main life insurance module 145's ability to calculate premiums and, instead, specify user-planned premiums for as many as five different time periods; 4) specify a certain amount of money to be taken out of the policy beginning at age sixty-five for ten years; and 5) be able to generically represent any existing policy and make risk assessments and re-balance future premium/cash value calculations.

Figure 37:
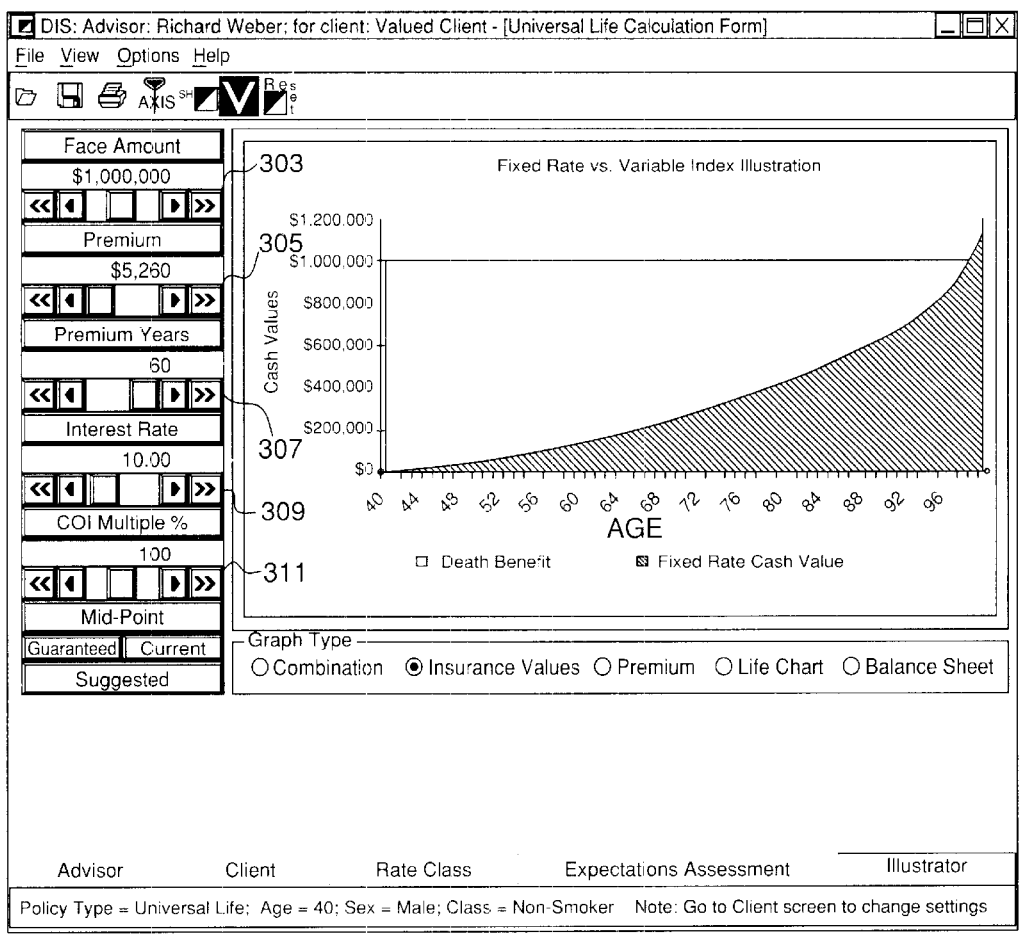
FIGS. 37–39 are main screen displays for the life insurance module utilizing the S&P500® module.

In FIG. 37, there is shown a "sufficient" insurance graph for a variable life insurance policy issued to a 40-year old male. A premium of $5,260 will be sufficient if an investment rate of return of 10% (net) can be achieved. However, the regulator-required use of a single, constant investment return can be quite misleading to the user's expectations. As shown in FIG. 38, when selecting a period of historic S&P500® Index investment returns, the user sees what would happen to the policy after applying the "ups and downs" of an arbitrary period of historic stock market returns to the policy projection. Therefore, in spite of the fact that the S&P500® has an average return in excess of 10% for the period used in this projection, actual year-to-year stock market performance would have caused the policy to lapse at age 93. As shown in FIG. 39, certainly, there are random continuous periods of the S&P500® Index that would provide sufficient net returns to make the policy sufficient based on the originally-calculated premium. Successive calculations, however, would demonstrate that there are fewer than 1 in 3 random periods of the S&P500® Index that would allow the low $5,260 premium to make the policy sufficient for all ages.

Without further elaboration, the foregoing will so fully illustrate our invention that others may, by applying current or future knowledge, readily adopt the same for use under various conditions of service.

We claim:

1. An apparatus for revealing to a user the risk inherent in financial planning, said apparatus comprising:
 (a) a computer including a memory, a processor and a graphical user interface;
 (b) input means coupled to said computer for inputting variables related to a financial plan into said computer by the user;
 (c) a monitor display coupled to said computer for displaying the variables and future values of the financial plan;
 (d) said memory including:
  (1) calculation means, operable by said processor, for calculating said future values of the financial plan;
  (2) at least one financial planning module, operable by said processor and coupled to said calculation means, for controlling said graphical user interface to generate said future values in graphical format; and
 (e) means for modifying, coupled to said at least one financial planning module, said at least one variable of the financial plan by the user from a first value to a second value, said at least one financial planning module controlling said graphical user interface in accordance with said modification of said at least one variable from said first value to said second value to provide a graphical representation of the risk inherent in the financial plan.

2. The apparatus of claim 1 wherein said graphical format comprises at least one of the group consisting of line graphs, area graphs and bar graphs.

3. The apparatus of claim 2 wherein said line graphs, area graphs and bar graphs are displayed in respective colors.

4. The apparatus of claim 3 wherein said at least one financial planning module generates a continuously changing display of said at least one of the group of line graphs, area graphs and bar graphs whenever said modifying means modifies said at least one variable from said first value to said second value to provide a graphical representation of the risk inherent in the financial plan.

5. The apparatus of claim 4 wherein said modifying means further comprises:
 (a) at least one slider bar, displayed on said monitor display, that permits the user to modify said at least one variable; and
 (b) at least one window, displayed on said monitor display adjacent said at least one slider bar, that displays the instantaneous value of said at least one variable.

6. The apparatus of claim 4 wherein said modifying means is further manipulated by the user to modify the financial plan and thereby re-balance the inherent risk in the financial plan to meet objectives of the user.

7. The apparatus of claim 1 wherein said at least one financial planning module is a retirement planning module and wherein the financial plan is a retirement plan.

8. The apparatus of claim 7 wherein said variables comprise value of qualified retirement plan assets, value of other retirement assets and assumed or desired rate of return.

9. The apparatus of claim 8 wherein said variables further comprise assumed rate of inflation, assumed effective income tax rate, desired retirement age, targeted monthly income, and necessary pre-retirement monthly user contribution.

10. The apparatus of claim 9 wherein said graphical format comprises at least one of the group consisting of line graphs, area graphs and bar graphs.

11. The apparatus of claim 10 wherein said line graphs, area graphs and bar graphs are displayed in respective colors.

12. The apparatus of claim 11 wherein said retirement planning module generates a continuously changing display of said at least one of the group of line graphs, area graphs and bar graphs whenever said modifying means modifies said at least one variable from said first value to said second value to provide a graphical representation of the risk inherent in the retirement plan.

13. The apparatus of claim 12 wherein said modifying means further comprises:
  (a) at least one slider bar, displayed on said monitor display, that permits the user to modify said at least one variable; and
  (b) at least one window, displayed on said monitor display adjacent said at least one slider bar, that displays the instantaneous value of said at least one variable.

14. The apparatus of claim 12 wherein said modifying means is further manipulated by the user to modify the retirement plan and thereby re-balance the inherent risk in the retirement plan to meet objectives of the user.

15. The apparatus of claim 14 wherein the retirement plan comprises an accumulation phase and a distribution phase, each having a respective rate of inflation, and wherein said retirement planning module utilizes the following factors for generating said graphic display: future annual user contributions, anticipated investment rate of return, and the respective rate of inflation of the accumulation phase.

16. The apparatus of claim 15 wherein the retirement plan is a qualified retirement plan and wherein the user has assets outside of the qualified retirement plan which are dedicated in the accumulation phase for retirement and wherein said retirement planning module utilizes the following factors of said assets outside of said qualified plan for generating said graphic display: future monthly user contributions, investment rate of return, anticipated rate of return on investment gains and the respective rate of inflation of the accumulation phase.

17. The apparatus of claim 15 wherein said retirement planning module utilizes the following factors for of the distribution phase for generating said graphic display: user target monthly income, user retirement age, effective tax rate during user retirement and inflation rate during user retirement.

18. The apparatus of claim 1 wherein said at least one financial planning module is a specific financial goal funding planning module and wherein the financial plan is a specific financial goal funding plan.

19. The apparatus of claim 18 wherein said variables comprise value of beginning capital, value of additional periodic contribution by user and assumed or desired rate of return.

20. The apparatus of claim 19 wherein said variables further comprise assumed rate of inflation, assumed effective income tax rate, number of years until user-desired withdrawal, targeted periodic user-withdrawal amount, and targeted withdrawal period.

21. The apparatus of claim 20 wherein said graphical format comprises at least one of the group consisting of line graphs, area graphs and bar graphs.

22. The apparatus of claim 21 wherein said line graphs, area graphs and bar graphs are displayed in respective colors.

23. The apparatus of claim 22 wherein said specific financial goal funding planning module generates a continuously changing display of said at least one of the group of line graphs, area graphs and bar graphs whenever said modifying means modifies said at least one variable from said first value to said second value to provide a graphical representation of the risk inherent in the specific financial goal funding plan.

24. The apparatus of claim 23 wherein said modifying means further comprises:
  (a) at least one slider bar, displayed on said monitor display, that permits the user to modify said at least one variable; and
  (b) at least one window, displayed on said monitor display adjacent said at least one slider bar, that displays the instantaneous value of said at least one variable.

25. The apparatus of claim 23 wherein said modifying means is further manipulated by the user to modify the specific financial goal funding plan and thereby re-balance the inherent risk in the specific financial goal funding plan to meet objectives of the user.

26. The apparatus of claim 1 wherein said at least one financial planning module is an estate planning module and wherein the financial plan is an estate plan.

27. The apparatus of claim 26 wherein said variables comprise value of current user assets in the estate, or assumed value of future assets in the estate, assumed or desired rate of return, and assumed rate of inflation.

28. The apparatus of claim 27 wherein said variables further comprise assumed life expectancy and estate tax.

29. The apparatus of claim 28 wherein said graphical format comprises bar graphs for depicting estate assets, estate taxes, net distributed estate and life insurance proceeds.

30. The apparatus of claim 29 wherein said bar graphs for depicting estate assets, estate taxes, net distributed estate and life insurance proceeds are displayed in respective colors.

31. The apparatus of claim 29 wherein the bar graphs for said estate assets are displayed on said monitor display in order of liquidity.

32. The apparatus of claim 31 wherein said order of liquidity comprises the most liquid estate assets being located at the top of said display and the least liquid estate asset being displayed at a lower position on said display.

33. The apparatus of claim 30 wherein said estate planning module generates a continuously changing display of said bar graphs whenever said modifying means modifies said at least one variable from said first value to said second value to provide a graphical representation of the risk inherent in the estate plan.

34. The apparatus of claim 33 wherein said modifying means further comprises:
  (a) at least one slider bar, displayed on said monitor display, that permits the user to modify said at least one variable; and
  (b) at least one window, displayed on said monitor display adjacent said at least one slider bar, that displays the instantaneous value of said at least one variable.

35. The apparatus of claim 33 wherein said modifying means is further manipulated by the user to modify the estate plan and thereby re-balance the inherent risk in the estate plan to meet objectives of the user.

36. The apparatus of claim 35 wherein said modifying means permits the user to extend or contract each of said bar graphs in order to re-balance the inherent risk in the estate plan to meet objectives of the user.

37. The apparatus of claim 1 wherein said at least one financial planning module is a life insurance planning module and wherein the financial plan is a life insurance plan.

38. The apparatus of claim 37 wherein said variables comprise a user's age, gender and rating class, face value of a life insurance policy, annual premiums, number of years premiums are paid and interest rate.

39. The apparatus of claim 38 wherein said memory further comprises expense tables and mortality tables that are used by said life insurance planning module for generating said future values of the life insurance plan in graphical format.

40. The apparatus of claim 39 wherein said graphical format comprises at least one of the group consisting of line graphs, area graphs and bar graphs.

41. The apparatus of claim 40 wherein said line graphs, area graphs and bar graphs are displayed in respective colors.

42. The apparatus of claim 41 wherein said life insurance planning module generates a continuously changing display of said at least one of the group of line graphs, area graphs and bar graphs whenever said modifying means modifies said at least one variable from said first value to said second value to provide a graphical representation of the risk inherent in the life insurance plan.

43. The apparatus of claim 42 wherein said modifying means further comprises:
(a) at least one slider bar, displayed on said monitor display, that permits the user to modify said at least one variable; and
(b) at least one window, displayed on said monitor display adjacent said at least one slider bar, that displays the instantaneous value of said at least one variable.

44. The apparatus of claim 42 wherein said modifying means is further manipulated by the user to modify the life insurance plan and thereby re-balance the inherent risk in the life insurance plan to meet objectives of the user.

45. The apparatus of claim 44 wherein said life insurance planning module generates a display screen that comprises a generic guaranteed values graph, a generic assumed values graph, a possible premiums graph and a life expectancy graph simultaneously and wherein all of which may continuously change whenever said modifying means modifies said at least one variable from said first value to said second value to provide a graphical representation of the risk inherent in the life insurance plan, said life expectancy graph comprising a graphical depiction of the actuarial chance of a user being alive at every age between a user's current age and an older predetermined age and including indicia representing an age where 50% of those people in a risk group of the user have died.

46. The apparatus of claim 44 wherein said life insurance planning module further comprises an increasing death benefit sub-module, said increasing death benefit sub-module permitting the user to visualize the risk with electing an increasing death benefit for a desired number of years and permitting the user to re-balance the risk to meet user objectives.

47. The apparatus of claim 44 wherein said life insurance planning module further comprises a $1^{st}$ year extra premiums sub-module, said $1^{st}$ year extra premiums sub-module permitting the user to enter an extra premium to be paid into the life insurance plan during the $1^{st}$ year, in addition to a regular-annual premium, to see the effects of said extra premium on the death benefit and cash value of the life insurance plan.

48. The apparatus of claim 44 wherein said life insurance planning module further comprises a varying premiums sub-module, said varying premiums sub-module permitting the user to enter various premiums to explore the risk associated with paying said premiums for the life insurance plan and permitting the user to re-balance the risk to meet user objectives.

49. The apparatus of claim 44 wherein said life insurance planning module further comprises a withdrawals sub-module, said withdrawals sub-module permitting the user to determine the amount of additional premiums necessary to keep a policy in-force when certain withdrawals of cash value are made from the life insurance plan at predetermined intervals.

50. The apparatus of claim 44 wherein said life insurance planning module further comprises an in-force sub-module, said in-force sub-module permitting the user to test a current life insurance plan against original assumptions made on the life insurance plan.

51. The apparatus of claim 1 further comprising an alternative investment appreciation module, said alternative investment appreciation module being used by said at least one financial planning module to estimate future investment appreciation using a period of sequential years of historic S&P500® annual returns.

52. The apparatus of claim 7 further comprising an alternative investment appreciation module, said alternative investment appreciation module being used by said retirement planning module to estimate future investment appreciation using a period of sequential years of historic S&P500® annual returns.

53. The apparatus of claim 18 further comprising an alternative investment appreciation module, said alternative investment appreciation module being used by said specific financial goal funding planning module to estimate future investment appreciation using a period of sequential years of historic S&P500® annual returns.

54. The apparatus of claim 26 further comprising an alternative investment appreciation module, said alternative investment appreciation module being used by said estate planning module to estimate future investment appreciation using a period of sequential S&P500® annual returns.

55. The apparatus of claim 37 further comprising an alternative investment appreciation module, said alternative investment appreciation module being used by said life insurance planning module to estimate future investment appreciation for variable life insurance plans using a period of sequential years of historic S&P500® annual returns.

56. A method for revealing the risk inherent in a financial plan, said method comprising the steps of:
(a) providing a computer including a memory, a processor, input means, and a monitor;
(b) supplying said computer with user-particular data and financial plan data through said input means;
(c) supplying said memory with finance algorithms;
(d) calculating future values of the financial plan using said user-particular data, financial plan data and said finance algorithms using said processor;
(e) modifying at least one variable of the financial plan by the user from a first value to a second value;
(f) presenting a continuously changing graphical display on said monitor in accordance with said modification of said at least one variable, said changing graphical display revealing the risk inherent in the financial plan.

57. The method of claim 56 further comprising the step of permitting the user to further modify said at least one variable to re-balance the risk to meet user objectives.

58. The method of claim 57 wherein said step of presenting a continuously changing graphical display comprises at least one of the group consisting of line graphs, area graphs and bar graphs continuously changing to provide the user with a visual depiction of the risk in the financial plan.

59. The method of claim 58 wherein said step of permitting the user to further modify said at least one variable to re-balance the risk to meet user objectives comprises a continuously changing graphical display of at least one of the group consisting of line graphs, area graphs and bar graphs that depict a modified financial plan that meets user objectives.

60. The method of claim 59 wherein said step of presenting a continuously changing graphical display includes displaying said line graphs, area graphs and bar graphs in respective colors.

61. The method of claim 56 wherein the financial plan is a retirement plan and wherein said user particular data and said financial plan data comprise qualified retirement plan assets, value of other retirement assets and assumed or desired rate of return.

62. The method of claim 61 wherein said user particular data and said financial plan data further comprise assumed rate of inflation, assumed effective income tax rate, desired retirement age, targeted monthly income and necessary pre-retirement monthly user contribution.

63. The method of claim 61 further comprising the step of permitting the user to further modify said at least one variable to re-balance the risk in the retirement plan to meet user objectives.

64. The method of claim 63 wherein said step of presenting a continuously changing graphical display comprises at least one of the group consisting of line graphs, area graphs and bar graphs continuously changing to provide the user with a visual depiction of the risk in the retirement plan.

65. The method of claim 64 wherein said step of permitting the user to further modify said at least one variable to re-balance the risk to meet user objectives comprises a continuously changing graphical display of at least one of the group consisting of line graphs, area graphs and bar graphs that depict a modified retirement plan that meets user objectives.

66. The method of claim 64 wherein said step of presenting a continuously changing graphical display includes displaying said line graphs, area graphs and bar graphs in respective colors.

67. The method of claim 65 wherein the retirement plan comprises an accumulation phase and a distribution phase, each having a respective rate of inflation, and wherein said user-particular data and said financial plan data further comprise future annual user contributions, anticipated investment rate of return, and the respective rate of inflation of the accumulation phase.

68. The method of claim 67 wherein the retirement plan is a qualified retirement plan and wherein the user has assets outside of the qualified retirement plan which are dedicated in the accumulation phase for retirement and wherein said user-particular data and said financial plan data further comprise future monthly user contributions, investment rate of return, anticipated rate of return on investment gains and the respective rate of inflation of the accumulation phase.

69. The method of claim 68 wherein said user-particular data and said financial plan data further comprise the following factors for of the distribution phase: user target monthly income, user retirement age, effective tax rate during user retirement and inflation rate during user retirement comprise future annual user contributions, anticipated investment rate of return, and the respective rate of inflation of the accumulation phase.

70. The method of claim 56 wherein the financial plan is a specific financial goal funding plan and wherein said user particular data and said financial plan data comprise value of beginning capital, value of additional periodic contribution by user and assumed or desired rate of return.

71. The method of claim 60 wherein said user-particular input and said financial plan data further comprise assumed rate of inflation, assumed effective income tax rate, number of years until user-desired withdrawal, targeted periodic user-withdrawal amount, and targeted withdrawal period.

72. The method of claim 71 further comprising the step of permitting the user to further modify said at least one variable to re-balance the risk in the specific financial goal funding plan to meet user objectives.

73. The method of claim 72 wherein said step of presenting a continuously changing graphical display comprises at least one of the group consisting of line graphs, area graphs and bar graphs continuously changing to provide the user with a visual depiction of the risk in the specific financial goal funding plan.

74. The method of claim 73 wherein said step of permitting the user to further modify said at least one variable to re-balance the risk to meet user objectives comprises a continuously changing graphical display of at least one of the group consisting of line graphs, area graphs and bar graphs that depict a modified specific financial goal funding plan that meets user objectives.

75. The method of claim 74 wherein said step of presenting a continuously changing graphical display includes displaying said line graphs, area graphs and bar graphs in respective colors.

76. The method of claim 56 wherein the financial plan is an estate plan and wherein said user particular data and said financial plan data comprise value of current user assets in the estate, or assumed value assets in the estate.

77. The method of claim 76 wherein said user particular data and said financial plan data further comprise assumed or desired rate of return, and assumed rate of inflation.

78. The method of claim 77 wherein said user particular data and said financial plan data further comprise assumed life expectancy and estate tax.

79. The method of claim 78 further comprising the step of permitting the user to further modify said at least one variable to re-balance the risk in the estate plan to meet user objectives.

80. The method of claim 79 wherein said step of presenting a continuously changing graphical display comprises bar graphs continuously changing to provide the user with a visual depiction of the risk in the estate plan.

81. The method of claim 80 wherein said step of permitting the user to further modify said at least one variable to re-balance the risk to meet user objectives comprises a continuously changing graphical display of said bar graphs that depict a modified estate plan that meets user objectives.

82. The method of claim 81 wherein said step of presenting a continuously changing graphical display includes displaying bar graphs of estate assets, estate taxes, net distributed estate and life insurance proceeds in respective colors.

83. The method of claim 82 further comprising the step of displaying said bar graphs for said estate assets in order of liquidity.

84. The method of claim 83 wherein said step of displaying said bar graphs for said estate assets in order of liquidity comprises displaying the most liquid estate asset at the top of said display and the least liquid estate asset at a lower position on said display.

85. The method of claim 56 wherein the financial plan is a life insurance plan and wherein said user particular data and said financial plan data comprise a user's age, gender and rating class, face value of a life insurance policy, annual premiums, number of years premiums are paid and interest rate.

86. The method of claim 85 wherein said financial plan data further comprise expense table data and mortality table data.

87. The method of claim 86 further comprising the step of permitting the user to further modify said at least one variable to re-balance the risk in the life insurance plan to meet user objectives.

88. The method of claim 87 wherein said step of presenting a continuously changing graphical display comprises at least one of the group consisting of line graphs, area graphs and bar graphs continuously changing to provide the user with a visual depiction of the risk in the life insurance plan.

89. The method of claim 88 wherein said step of permitting the user to further modify said at least one variable to re-balance the risk to meet user objectives comprises a continuously changing graphical display of at least one of the group consisting of line graphs, area graphs and bar graphs that depict a modified life insurance plan that meets user objectives.

90. The method of claim 89 wherein said step of presenting a continuously changing graphical display includes displaying said line graphs, area graphs and bar graphs in respective colors.

91. The method of claim 90 further comprising the step of permitting the user to visualize the risk with electing an increasing death benefit for a desired number of years and permitting the user to re-balance the risk to meet user objectives.

92. The method of claim 90 further comprising the step permitting the user to enter an extra premium to be paid into the life insurance plan during the $1^{st}$ year, in addition to a regular-annual premium, to see the effects of said extra premium on the death benefit and cash value of the life insurance plan.

93. The method of claim 90 further comprising the step of permitting the user to enter various premiums to explore the risk associated with paying said premiums for the life insurance plan and permitting the user to re-balance the risk to meet user objectives.

94. The method of claim 90 further comprising the step of permitting the user to determine the amount of additional premiums necessary to keep a policy in-force when certain withdrawals of cash value are made from the life insurance plan at predetermined intervals.

95. The method of claim 90 further comprising the step of permitting the user to test a current life insurance plan against original assumptions made on the life insurance plan.

96. The method of claim 56 further comprising the step of estimating future investment appreciation by applying a period of sequential years of historic S&P500® annual returns during said step of calculating future values.

97. The method of claim 61 further comprising the step of estimating future investment appreciation by applying a period of sequential years of historic S&P500® annual returns during said step of calculating future values.

98. The method of claim 70 further comprising the step of estimating future investment appreciation by applying a period of sequential years of historic S&P500® annual returns during said step of calculating future values.

99. The method of claim 85 further comprising the step of estimating future investment appreciation by applying a period of sequential years of historic S&P500° annual returns during said step of calculating future values for a variable life insurance plan.

* * * * *